(12) United States Patent
Lee et al.

(10) Patent No.: US 10,999,837 B2
(45) Date of Patent: *May 4, 2021

(54) METHOD FOR SETTING DYNAMIC SUBFRAME IN WIRELESS COMMUNICATION SYSTEM AND DEVICE THEREFOR

(71) Applicant: LG ELECTRONICS INC., Seoul (KR)

(72) Inventors: Seungmin Lee, Anyang-si (KR); Hanbyul Seo, Anyang-si (KR)

(73) Assignee: LG ELECTRONICS INC., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 16/043,444

(22) Filed: Jul. 24, 2018

(65) Prior Publication Data
US 2018/0332581 A1    Nov. 15, 2018

Related U.S. Application Data

(63) Continuation of application No. 14/000,582, filed as application No. PCT/KR2012/001652 on Mar. 7, 2012, now Pat. No. 10,051,622.
(Continued)

(51) Int. Cl.
*H04W 72/04* (2009.01)
*H04L 5/00* (2006.01)
(Continued)

(52) U.S. Cl.
CPC ...... *H04W 72/0446* (2013.01); *H04L 5/0096* (2013.01); *H04L 5/1469* (2013.01);
(Continued)

(58) Field of Classification Search
CPC ..... H04L 5/001; H04L 5/0055; H04L 5/0087; H04L 5/0096; H04L 5/1469;
(Continued)

(56) References Cited

U.S. PATENT DOCUMENTS 8,767,606 B2 * 7/2014 Yi ............... H04W 72/005
370/229
9,014,064 B2 * 4/2015 He ............... H04B 7/0417
370/280
(Continued)

FOREIGN PATENT DOCUMENTS

CN    101478383 A    7/2009
CN    101489255 A    7/2009
(Continued)

OTHER PUBLICATIONS

Moon, "Key Issues of 3GPP LTE-Advanced," 4G Technical Research Gr. MCTRL, Jun. 21, 2010, pp. 1-66.
(Continued)

*Primary Examiner* — Asad M Nawaz
*Assistant Examiner* — Kai Chang
(74) *Attorney, Agent, or Firm* — Birch, Stewart, Kolasch & Birch, LLP

(57) ABSTRACT

A method for receiving a downlink data by a user equipment (UE) in a wireless communication system is discussed. The method includes receiving system information including an uplink-downlink (UL-DL) configuration, and controlling a reception operation for the downlink data on a UL subframe indicated by the UL-DL configuration, based on a higher layer signaling, wherein the higher layer signaling indicates whether the UL subframe is used for a Multicast Broadcast Single Frequency Network (MBSFN) subframe when the UL subframe is reconfigured to a DL subframe based on an indication of a physical control channel.

6 Claims, 16 Drawing Sheets

Related U.S. Application Data

(60) Provisional application No. 61/579,655, filed on Dec. 23, 2011, provisional application No. 61/472,613, filed on Apr. 6, 2011, provisional application No. 61/451,599, filed on Mar. 11, 2011.

(51) Int. Cl.
*H04L 5/14* (2006.01)
*H04W 72/12* (2009.01)

(52) U.S. Cl.
CPC ... *H04W 72/1284* (2013.01); *H04W 72/1289* (2013.01); *H04L 5/001* (2013.01); *H04L 5/0055* (2013.01); *H04L 5/0087* (2013.01)

(58) Field of Classification Search
CPC ............ H04L 5/0091; H04W 72/0446; H04W 72/1284; H04W 72/1289
See application file for complete search history.

(56) References Cited

U.S. PATENT DOCUMENTS

| | | | |
|---|---|---|---|
| 9,084,243 B2 * | 7/2015 | Yang | H04W 72/0413 |
| 9,173,227 B2 * | 10/2015 | Lv | H04W 72/1215 |
| 9,197,683 B2 * | 11/2015 | Fwu | H04W 36/0094 |
| 10,003,439 B2 * | 6/2018 | Lee | H04L 1/1812 |
| 2008/0095106 A1 | 4/2008 | Malladi et al. | |
| 2009/0122771 A1 | 5/2009 | Cai | |
| 2009/0175232 A1 | 7/2009 | Kolding | |
| 2009/0201838 A1 | 8/2009 | Zhang et al. | |
| 2009/0249153 A1 | 10/2009 | Zhang | |
| 2009/0268685 A1 | 10/2009 | Chen et al. | |
| 2010/0080139 A1 | 4/2010 | Palanki et al. | |
| 2010/0111024 A1 | 5/2010 | Fan et al. | |
| 2010/0177669 A1 | 7/2010 | Suo et al. | |
| 2010/0211845 A1 | 8/2010 | Lee et al. | |
| 2010/0271999 A1 | 10/2010 | Yu et al. | |
| 2010/0329171 A1 | 12/2010 | Kuo et al. | |
| 2011/0007674 A1 | 1/2011 | Dai et al. | |
| 2011/0038285 A1 | 2/2011 | Kwon et al. | |
| 2011/0103272 A1 | 5/2011 | Dai et al. | |
| 2011/0103286 A1 | 5/2011 | Montojo et al. | |
| 2011/0149774 A1 | 6/2011 | Chen et al. | |
| 2011/0188481 A1 | 8/2011 | Damnjanovic et al. | |
| 2011/0211503 A1 | 9/2011 | Che et al. | |
| 2011/0211522 A1 | 9/2011 | Chung et al. | |
| 2011/0216676 A1 | 9/2011 | Li et al. | |
| 2011/0235599 A1 | 9/2011 | Nam et al. | |
| 2011/0261747 A1 * | 10/2011 | Wang | H04B 7/155 370/315 |
| 2011/0268053 A1 | 11/2011 | Che et al. | |
| 2011/0317670 A1 | 12/2011 | Zhang et al. | |
| 2012/0002591 A1 | 1/2012 | Noh et al. | |
| 2012/0039232 A1 | 2/2012 | Kwon et al. | |
| 2012/0039233 A1 * | 2/2012 | Kim | H04W 72/005 370/312 |
| 2012/0039236 A1 | 2/2012 | Lv | |
| 2012/0044890 A1 | 2/2012 | Jen | |
| 2012/0051283 A1 | 3/2012 | Takahashi et al. | |
| 2012/0106432 A1 | 5/2012 | Lee et al. | |
| 2012/0113875 A1 * | 5/2012 | Alanara | H04W 72/1236 370/280 |
| 2012/0120909 A1 | 5/2012 | Ng | |
| 2012/0147794 A1 | 6/2012 | Chung et al. | |
| 2012/0176884 A1 | 7/2012 | Zhang et al. | |
| 2012/0176957 A1 | 7/2012 | Chen et al. | |
| 2012/0257554 A1 * | 10/2012 | Kim | H04L 1/1887 370/280 |
| 2012/0281654 A1 | 11/2012 | Aiba et al. | |
| 2012/0294204 A1 | 11/2012 | Chen et al. | |
| 2013/0010709 A1 | 1/2013 | Earnshaw et al. | |
| 2013/0010720 A1 | 1/2013 | Lohr et al. | |
| 2013/0039284 A1 | 2/2013 | Marinier et al. | |
| 2013/0058233 A1 | 3/2013 | Kim | |
| 2013/0058264 A1 | 3/2013 | Gan et al. | |
| 2013/0064099 A1 | 3/2013 | Kim et al. | |
| 2013/0077593 A1 | 3/2013 | Han et al. | |
| 2013/0090055 A1 | 4/2013 | Pitakdumrongkija et al. | |
| 2013/0142268 A1 | 6/2013 | Gao et al. | |
| 2013/0242823 A1 | 9/2013 | Lin et al. | |
| 2013/0336177 A1 | 12/2013 | Gao et al. | |
| 2014/0161001 A1 | 6/2014 | Gao et al. | |
| 2015/0156765 A1 * | 6/2015 | Kim | H04B 7/155 370/280 |

FOREIGN PATENT DOCUMENTS

| | | |
|---|---|---|
| CN | 101615947 A | 12/2009 |
| CN | 101854589 A | 10/2010 |
| CN | 101925110 A | 12/2010 |
| CN | 101926214 A | 12/2010 |
| EP | 2200208 A1 | 6/2010 |
| JP | 101562889 A | 10/2009 |
| JP | 101594211 A | 10/2009 |
| KR | 10-2010-0106364 A | 10/2010 |
| KR | 10-2010-0139062 A | 12/2010 |
| KR | 10-2011-0008292 A | 1/2011 |
| WO | WO 2010/049587 A1 | 5/2010 |
| WO | WO 2010/110584 A2 | 9/2010 |

OTHER PUBLICATIONS

3GPP, "3rd Generation Partnership Project; Technical Specification Group Radio Access Network; Evolved Universal Terrestrial Radio Access (E-UTRA); Radio Resource Control (RRC); Protocol specification (Release 10)," 3GPP TS 36.331, V10.0.0, Dec. 2010, pp. 1-276.

* cited by examiner (a) Control - Plane Protocol Stack (b) User - Plane Protocol Stack

METHOD FOR SETTING DYNAMIC SUBFRAME IN WIRELESS COMMUNICATION SYSTEM AND DEVICE THEREFOR

CROSS-REFERENCE TO RELATED APPLICATIONS

This Application is a Continuation of U.S. patent application Ser. No. 14/000,582 filed on Aug. 20, 2013 (now U.S. Pat. No. 10,051,622 issued on Aug. 14, 2018), which is the National Phase of PCT International Application No. PCT/KR2012/001652 filed on Mar. 7, 2012, which claims the priority benefit under 35 U.S.C. § 119(e) to U.S. Provisional Application Nos. 61/579,655 filed on Dec. 23, 2011, 61/472,613 filed on Apr. 6, 2011 and 61/451,599 filed on Mar. 11, 2011, all of which are hereby expressly incorporated by reference into the present application

BACKGROUND OF THE INVENTION

Field of the Invention

Embodiments of the present invention relate to a wireless communication system, and more particularly to a method and apparatus for setting a dynamic subframe in a wireless communication system.

Discussion of the Related Art

As a representative example of a wireless communication system of the present invention, $3^{rd}$ Generation Partnership Project Long Term Evolution (3GPP LTE) and LTE-Advanced (LTE-A) communication systems will hereinafter be described in detail.

FIG. 1 is a conceptual diagram illustrating an Evolved Universal Mobile Telecommunications System (E-UMTS) network structure as an exemplary mobile communication system. In particular, the Enhanced Universal Mobile Telecommunications System (E-UMTS) has evolved from a legacy UMTS system, and basic standardization thereof is now being conducted by the 3rd Generation Partnership Project (3GPP). E-UMTS may also be referred to as Long Term Evolution (LTE). For details of the technical specifications of UMTS and E-UMTS, refer to Release 7 and Release 8 of "3rd Generation Partnership Project; Technical Specification Group Radio Access Network".

As shown in FIG. 1, the E-UMTS system is broadly made up of a User Equipment (UE) 120, base stations (or eNode-Bs) 110a and 110b, and an Access Gateway (AG) which is located at an end of a network (E-UTRAN) and is connected to an external network. Generally, an eNode-B can simultaneously transmit multiple data streams for a broadcast service, a multicast service and/or a unicast service.

Each eNode-B includes one or more cells. One cell of the eNode-B is set to use a bandwidth such as 1.25, 2.5, 5, 10, 15 or 20 MHz to provide a downlink or uplink transmission service to user equipments (UEs). Here, different cells may be set to use different bandwidths. The eNode-B controls transmission and reception of data for several UEs. In association with downlink (DL) data, the eNode-B transmits downlink (DL) scheduling information to a corresponding UE, so as to inform the corresponding UE of time/frequency domains where data is to be transmitted, coding information, data size information, Hybrid Automatic Repeat and reQuest (HARQ)—related information, and the like. In association with uplink (UL) data, the eNode-B transmits UL scheduling information to the corresponding UE, so that it informs the corresponding UE of time/frequency domains capable of being used by the corresponding UE, coding information, data size information, HARQ-related information, and the like. An interface for transmission of user traffic or control traffic may be used between eNode-Bs. A Core Network (CN) may include an Access Gateway (AG) and a network node for user registration of the UE. The AG manages mobility of a UE on the basis of a Tracking Area (TA) composed of several cells.

Although wireless communication technology has been developed to LTE technology on the basis of WCDMA technology, users and enterprises continuously demand new features and services. In addition, other wireless access technologies are being developed, such that there is a need for new or improved wireless access technology in order to remain competitive in the long run. For example, reduction in cost per bit, increase of service availability, adaptive frequency band utilization, a simple structure, an open-type interface, and appropriate user equipment (UE) power consumption are needed for new or improved wireless access technology.

SUMMARY OF THE INVENTION

Accordingly, the present invention is directed to a method and apparatus for setting a dynamic subframe in a wireless communication system that substantially obviates one or more problems due to limitations and disadvantages of the related art.

The object of the present invention can be achieved by providing a method for transmitting/receiving a signal to/from a base station (BS) by a user equipment (UE) in a wireless communication system including: receiving an indicator for changing a specific subframe allocated to one usage from among downlink (DL) and uplink (UL) resources to another usage through a physical control channel received from the base station (BS); and transmitting or receiving a signal to/from the base station (BS) at the specific frame according to the indicator.

In accordance with another aspect of the present invention, a user equipment (UE) device for a wireless communication system includes: a radio frequency (RF) communication module configured to transmit/receive a signal to/from a base station (BS); and a processor configured to process the signal. If the processor receives an indicator for changing a specific subframe allocated to one usage from among downlink (DL) and uplink (UL) resources to another usage through a physical control channel received from the base station (BS), the processor controls the RF communication module to transmit or receive a signal to/from the base station (BS) at the specific frame according to the indicator.

The indicator may be any one of a Carrier indication Field (CIF), a Downlink Assignment Index (DAD, or a UL index.

If the indicator indicates that a usage of the specific subframe established for uplink resource is changed to downlink resource usage, the indicator may be received at a downlink subframe at which an uplink grant is to be received when the specific subframe is used for uplink resource usage.

The method may further include: if the indicator indicates that a usage of the specific subframe #n established for uplink resource is changed to downlink resource usage, transmitting, by the indicator, a response of a signal received at the specific subframe #n at the nearest available uplink subframe, wherein a subframe index satisfies #(n+k) (where k≥4, and k is an integer) at the nearest available uplink subframe. The method may further include: transmitting a response of the signal received at a downlink subframe interlocked to transmit the response at the specific subframe #n, at the nearest available uplink subframe in which a subframe index satisfies #(n+p) (where p≥1, and p is an integer).

The method may further include: receiving subframe configuration information needed to transmit/receive a response for the specific subframe having the changed usage, from the base station (BS). The subframe configuration information may be received through a higher layer.

As is apparent from the above description, according to exemplary embodiments of the present invention, a dynamic subframe allocation method can be efficiently performed in a wireless communication system.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DETAILED DESCRIPTION OF THE EMBODIMENTS

Reference will now be made in detail to the preferred embodiments of the present invention, examples of which are illustrated in the accompanying drawings. Wherever possible, the same reference numbers will be used throughout the drawings to refer to the same or like parts. The above and other configurations, operations, and features of the present invention will be easily understood from the embodiments of the invention described below with reference to the accompanying drawings. The embodiments described below are examples wherein technical features of the invention are applied to a $3^{rd}$ Generation Partnership Project (3GPP) system.

Although the embodiment of the present invention will be disclosed on the basis of an LTE system and an LTE-A system for convenience of description and better understanding of the present invention, it should be noted that the scope or spirit of the present invention is not limited thereto and can be applied to other communication systems as necessary.

Figure 1:
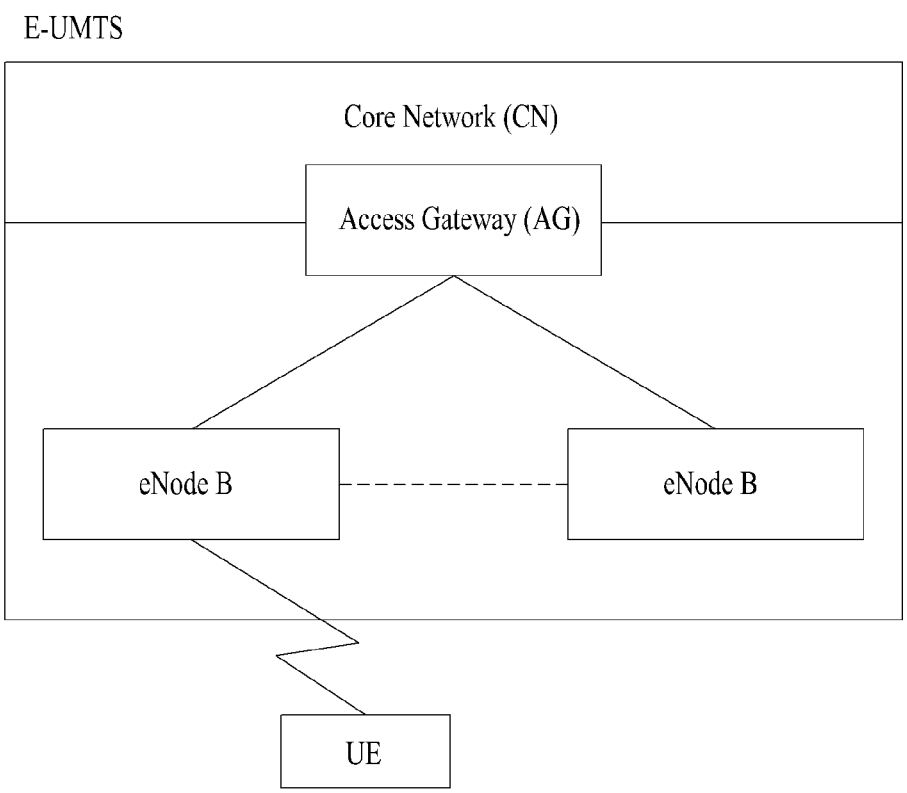
FIG. 1 is a conceptual diagram illustrating an Evolved Universal Mobile Telecommunications System (E-UMTS) network structure as an example of a wireless communication system.
Figure 2:
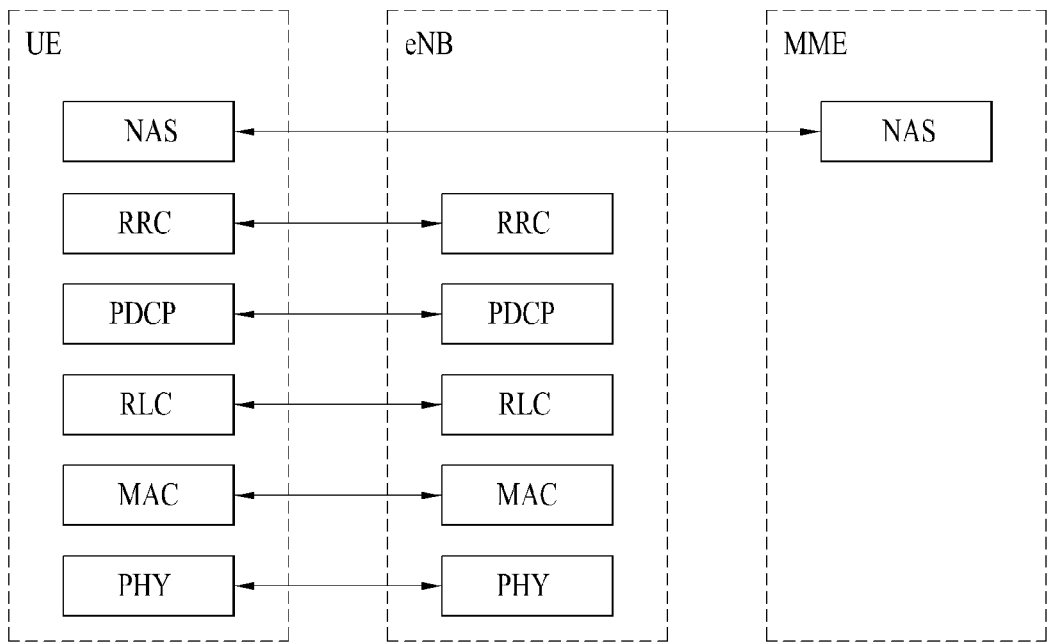
FIG. 2 illustrates a control plane and a user plane (U-Plane) of a radio interface protocol between a User Equipment (UE) and an E-UTRAN according to the 3GPP wireless access network standard.
Figure 2:
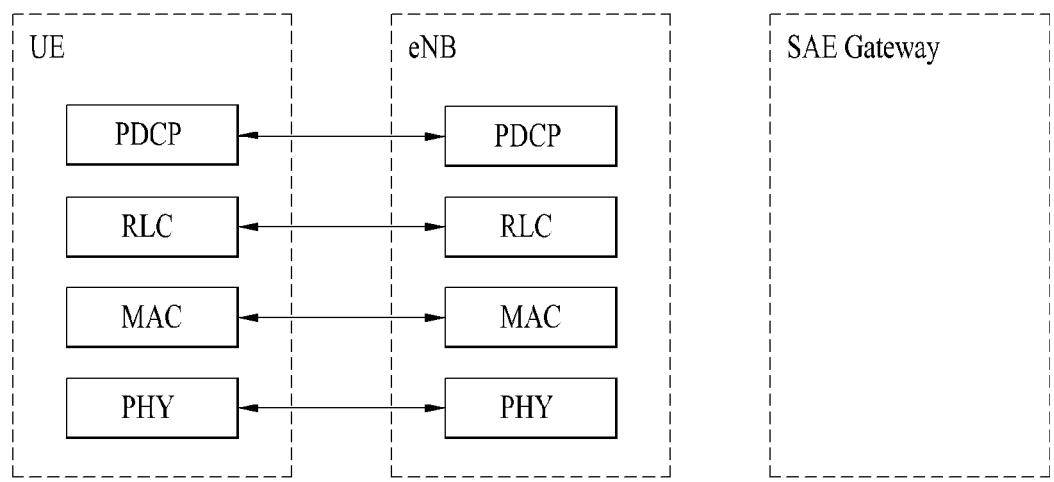

FIG. 2 illustrates a control plane and a user plane (U-Plane) of a radio interface protocol between a User Equipment (UE) and an E-UTRAN according to the 3GPP wireless access network standard. The control plane is a passage through which control messages that a UE and a network use in order to manage calls are transmitted. The user plane is a passage through which data (e.g., voice data or Internet packet data) generated at an application layer is transmitted.

The physical layer, which is the first layer, provides an information transfer service to an upper layer using a physical channel. The physical layer is connected to a Medium Access Control (MAC) layer, located above the physical layer, through a transport channel. Data is transferred between the MAC layer and the physical layer through the transport channel. Data transfer between different physical layers, specifically between the respective physical layers of transmitting and receiving sides, is performed through the physical channel. The physical channel uses time and frequency information as radio resources. In more detail, using the time and frequency information as radio resources, the physical channel is modulated according to the Orthogonal Frequency Division Multiple Access (OFDMA) scheme via a downlink, and is modulated according to the Single Carrier Frequency Division Multiple Access (SC-FDMA) scheme via an uplink.

The MAC layer of the second layer provides a service to a Radio Link Control (RLC) layer, located above the MAC layer, through a logical channel. The RLC layer of the second layer enhances data transmission reliability. The functions of the RLC layer may also be implemented through internal functional blocks of the MAC layer. A PDCP layer of the second layer performs a header compression function to reduce unnecessary control information in order to efficiently transmit IP packets such as IPv4 or IPv6 packets over a radio interface with a relatively narrow bandwidth.

A Radio Resource Control (RRC) layer located at the lowest part of the third layer is defined only in the control plane and is responsible for control of logical, transport, and physical channels in association with configuration, re-configuration and release of Radio Bearers (RBs). The radio bearer (RB) is a service that the second layer provides for data communication between the UE and the network. To accomplish this, the RRC layer of the UE and the RRC layer of the network exchange RRC messages. The UE is in RRC connected mode if an RRC connection has been established between the RRC layer of the network and the RRC layer of the UE. Otherwise, the UE is in RRC idle mode. A Non-Access Stratum (NAS) layer located above the RRC layer performs functions such as session management and mobility management.

One cell of the eNB (eNode-B) is set to use a bandwidth such as 1.25, 2.5, 5, 10, 15 or 20 MHz to provide a downlink or uplink transmission service to UEs. Here, different cells may be set to use different bandwidths.

Downlink transport channels for transmission of data from the network to the UE include a Broadcast Channel (BCH) for transmission of system information, a Paging Channel (PCH) for transmission of paging messages and a downlink Shared Channel (SCH) for transmission of user traffic or control messages. User traffic or control messages of a downlink multicast or broadcast service may be transmitted through a downlink SCH and may also be transmitted through a downlink multicast channel (MCH). Uplink transport channels for transmission of data from the UE to the network include a Random Access Channel (RACH) for transmission of initial control messages and an uplink SCH for transmission of user traffic or control messages. Logical channels, which are located above the transport channels and are mapped to the transport channels, include a Broadcast Control Channel (BCCH), a Paging Control Channel (PCCH), a Common Control Channel (CCCH), a Multicast Control Channel (MCCH) and a Multicast Traffic Channel (MTCH).

Figure 3:
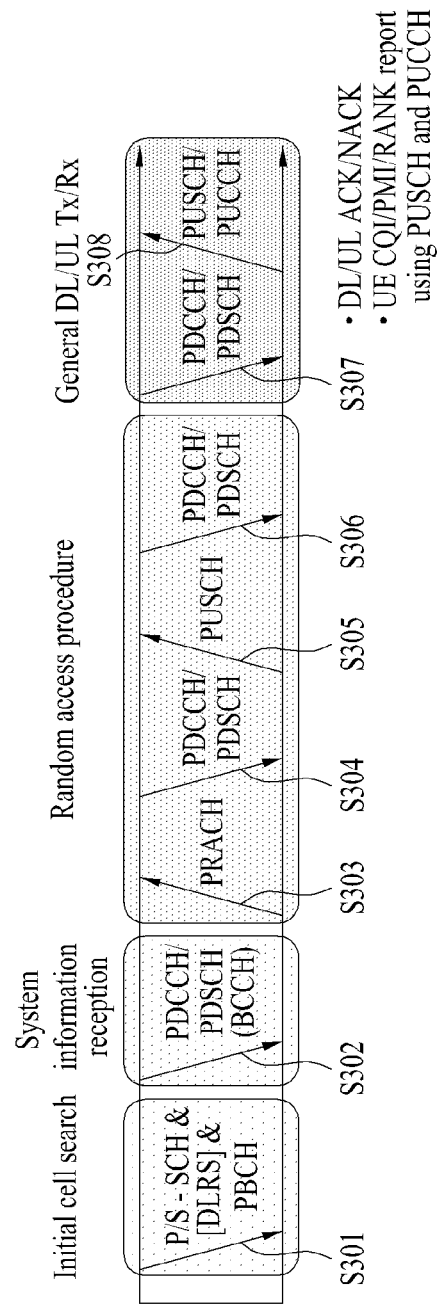
FIG. 3 is a conceptual diagram illustrating physical channels used in a 3GPP LTE system as an exemplary mobile communication system and a general method for transmitting a signal using the physical channels.

FIG. 3 is a conceptual diagram illustrating physical channels for use in a 3GPP system and a general method for transmitting a signal using the physical channels.

Referring to FIG. 3, when powered on or when entering a new cell, a UE performs initial cell search in step S301. The initial cell search involves synchronization with a BS. Specifically, the UE synchronizes with the BS and acquires a cell Identifier (ID) and other information by receiving a Primary Synchronization CHannel (P-SCH) and a Secondary Synchronization CHannel (S-SCH) from the BS. Then the UE may acquire information broadcast in the cell by receiving a Physical Broadcast CHannel (PBCH) from the BS. During the initial cell search, the UE may monitor a downlink channel status by receiving a downlink Reference Signal (DL RS).

After the initial cell search, the UE may acquire more specific system information by receiving a Physical Downlink Control CHannel (PDCCH) and receiving a Physical Downlink Shared CHannel (PDSCH) based on information of the PDCCH in step S302.

On the other hand, if the UE initially accesses the BS or if the UE does not have radio resources for signal transmission, it may perform a random access procedure to the BS in steps S303 to S306. For the random access, the UE may transmit a predetermined sequence as a preamble to the BS on a Physical Random Access CHannel (PRACH) in steps S303 and S305 and receive a response message for the random access on a PDCCH and a PDSCH corresponding to the PDCCH in steps S304 and S306. In the case of contention-based RACH, the UE may perform a contention resolution procedure.

After the foregoing procedure, the UE may receive a PDCCH and a PDSCH in step S307 and transmit a Physical Uplink Shared CHannel (PUSCH) and a Physical Uplink Control CHannel (PUCCH) in step S308, as a general downlink/uplink (DL/UL) signal transmission procedure. Specifically, the UE may receive downlink control information (DCI) through a PDCCH. In this case, DCI includes control information such as resource allocation information for the UE, and has different formats according to usage purposes.

On the other hand, uplink control information transmitted from the UE to the BS or downlink control information transmitted from the UE to the BS may include a downlink (DL) or uplink (UL) ACKnowledgment/Negative ACKnowledgment (ACK/NACK) signal, a Channel Quality Indicator (CQI), a Precoding Matrix Index (PMI) and/or a Rank Indicator (RI). The UE adapted to operate in the 3GPP LTE system may transmit the control information such as a CQI, a PMI, and/or an RI on the PUSCH and/or the PUCCH.

Figure 4:
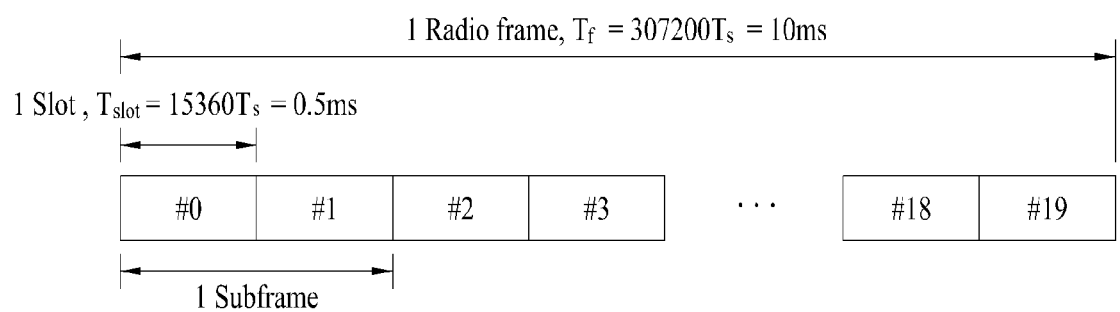
FIG. 4 is a diagram illustrating a structure of a radio frame for use in a Long Term Evolution (LTE) system.

FIG. 4 is a diagram illustrating a structure of a radio frame used in an LTE system.

Referring to FIG. 4, the radio frame has a length of 10 ms ($327200 \cdot T_s$) and includes 10 subframes of equal size. Each subframe has a length of 1 ms and includes two slots. Each slot has a length of 0.5 ms ($15360 \cdot T_s$). In this case, $T_s$ represents sampling time, and is expressed by '$T_s = 1/(15 \text{ kHz} \times 2048) = 3.2552 \times 10^{-8}$ (about 33 ns)'. The slot includes a plurality of OFDM symbols in a time domain, and includes a plurality of resource blocks (RBs) in a frequency domain. In the LTE system, one resource block includes twelve (12) subcarriers×seven (or six) OFDM (Orthogonal Frequency Division Multiplexing) symbols. A Transmission Time Interval (TTI) which is a transmission unit time of data can be determined in a unit of one or more subframes. The aforementioned structure of the radio frame is only exemplary, and various modifications can be made to the number of subframes contained in the radio frame or the number of slots contained in each subframe, or the number of OFDM symbols in each slot.

Figure 5:
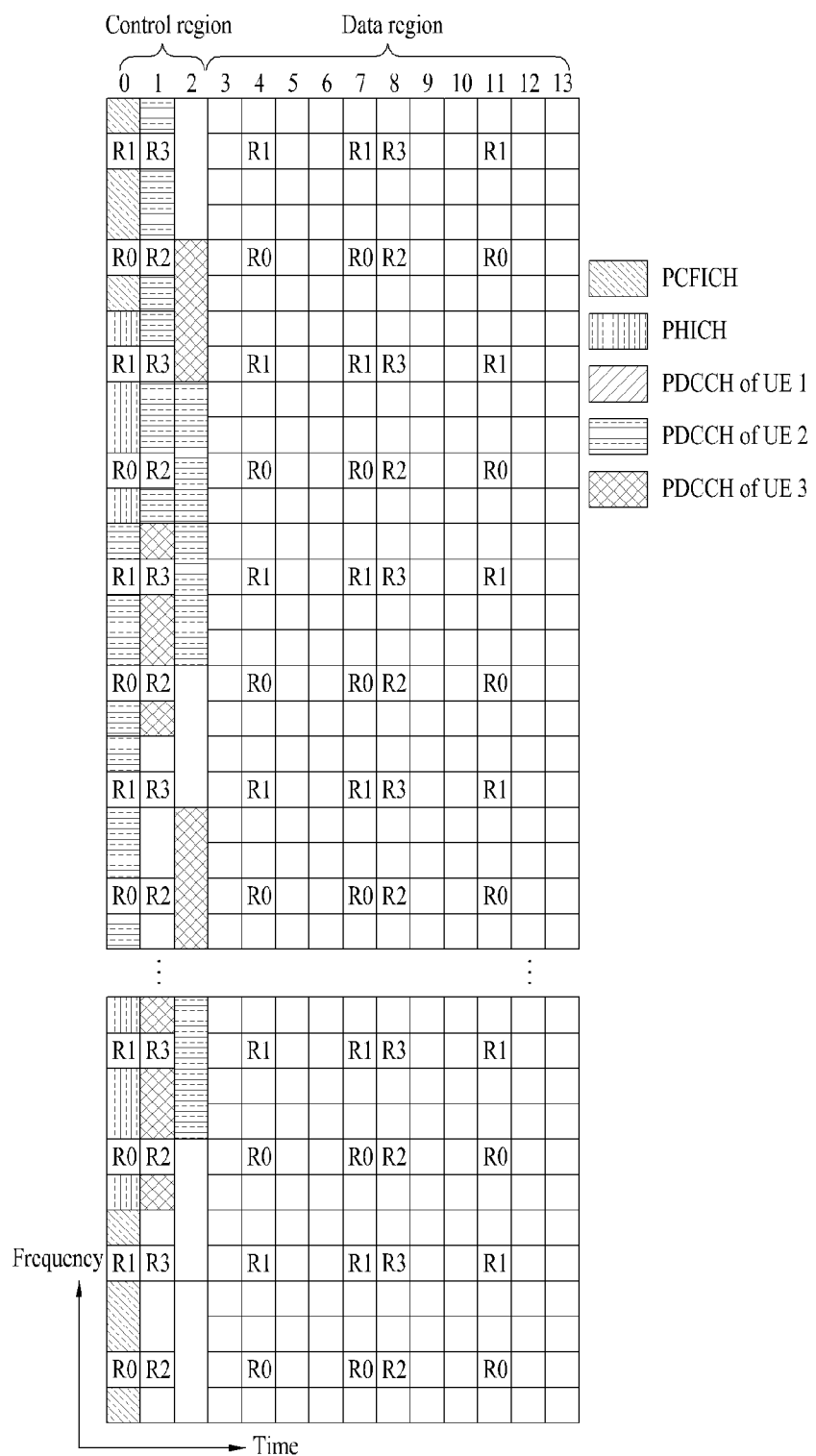
FIG. 5 is a conceptual diagram illustrating a downlink radio frame for use in an LTE system.

FIG. 5 shows a control channel contained in a control region of one subframe in a downlink radio frame according to one embodiment of the present invention.

Referring to FIG. 5, one subframe includes 14 OFDM symbols. First to third ones of the 14 OFDM symbols may be used as a control region, and the remaining OFDM symbols (i.e., 11 to 13 OFDM symbols) may be used as a data region. In FIG. 5, R1 to R4 represent reference signals (RSs) (also called pilot signals) of antennas 0 to 3, respectively. In a general subframe, RSs of the antennas 0 to 3 are fixed to a predetermined pattern irrespective of a control region and a data region. The control channel is allocated to a resource, to which the RS is not allocated, in the control region. A traffic channel is allocated to a resource, to which the RS is not allocated, in the data region. A variety of control channels may be allocated to the control region, for example, a physical control format indicator channel (PCFICH), a physical hybrid—ARQ indicator channel (PHICH), a physical downlink control channel (PDCCH), etc.

PCFICH is used as a physical control format indicator channel, and informs the UE of the number of OFDM symbols used for PDCCH at every subframe. PCFICH is located at a first OFDM symbol, and is established to have priority over PHICH and PDCCH. PCFICH includes 4 resource element groups (REGs), and individual REGs are distributed into the control region on the basis of a cell ID. One REG includes four REs. The RE is a minimum physical resource defined by 'one subcarrier×one OFDM symbol'. The PCFICH value indicates values of 1 to 3 or values of 2 to 4 according to bandwidth, and is QPSK (Quadrature Phase Shift Keying)—modulated.

PHICH is used as a physical HARQ (Hybrid—Automatic Repeat and reQuest) indicator channel, and carries HARQ ACK/NACK signals for uplink transmission. In other words, PHICH indicates a channel for transmitting DL ACK/NACK information for UL HARQ. The PHICH includes one REG, and is cell-specifically scrambled. An ACK/NACK signal indicated by one bit is BPSK (Binary Phase Shift Keying)-modulated. The modulated ACK/NACK is spread with a spreading factor (SF) of 2 or 4. Several PHICHs mapped to the same resources construct a PHICH group. The number of PHICHs multiplexed in the PHICH group may be determined according to the number of spreading codes. PHICH (or PHICH group) may be repeated three times so as to obtain a diversity gain from a frequency domain and/or a time domain.

PDCCH acting as a physical downlink control channel is allocated to N first OFDM symbols of a subframe. In this case, N is an integer of 1 or higher and is indicated by a PCFICH. PDCCH includes one or more CCEs. PDCCH may inform each UE or a UE group of information related to resource allocation of PCH (Paging Channel) and DL-SCH (Downlink-shared channel), uplink scheduling grant, HARQ information, etc. The PCH and the DL-SCH are transmitted through a PDSCH. Therefore, the BS and the UE may transmit and receive data other than either specific control information or specific service data through the PDSCH.

Information indicating which UE will receive data as an input, information indicating how the UEs receive PDSCH data, and information indicating whether decoding is carried out are contained in the PDCCH. For example, it is assumed that a specific PDCCH is CRC-masked with a Radio Network Temporary Identity (RNTI) called 'A', and information that is transmitted using radio resources 'B' (for example, a frequency location) and transmission format information 'C' (for example, a transmission block size, a modulation scheme, coding information, etc.), is transmitted through a specific subframe. In this case, a UE located in a cell monitors a PDCCH using its own RNTI information. If at least one UE having the RNTI 'A' is present, the UEs receive PDCCH and receive PDSCH indicated by 'B' and 'C' through the received PDCCH information.

In the meantime, if a channel condition between the base station (BS) and the UE is poor, a relay node (RN) is installed between the BS and the UE such that it can provide an RF channel having superior channel conditions to the UE. In addition, a relay node (RN) is introduced to a cell edge region having a poor channel condition such that it can provide a higher-speed data channel and can extend a cell service region. As described above, the relay node (RN) has been widely used to solve the propagation shade region in a wireless communication system.

Compared to the conventional art that is restricted to functions of a repeater capable of amplifying/transmitting a signal, the latest technology is being developed to cover more intelligent techniques. Furthermore, the relay node (RN) technology can reduce costs associated with increasing the number of BSs and maintenance costs of a backhaul network in next generation mobile communication systems, and is requisite for extending the service coverage simultaneously while increasing the data processing rate. With the increasing development of relay node (RN) technology, the necessity for the relay node (RN) used in the conventional wireless communication system to be supported by the new wireless communication system is also increasing.

As the technology for forwarding a link connection between the BS and the UE is introduced to a relay node (RN) in a 3$^{rd}$ Generation Partnership Project Long Term Evolution—Advanced (3GPP LTE-A) system, two links having different attributes are applied to a UL carrier frequency band and a DL carrier frequency band. The connection link between the BS and the RN is defined as a backhaul link. Transmission of data using downlink (DL) resources according to a Frequency Division Duplexing (FDD) or Time Division Duplexing (TDD) scheme is referred to as backhaul downlink. Transmission of data using uplink (UL) resources according to the FDD or TDD scheme is referred to as backhaul uplink.

Figure 6:
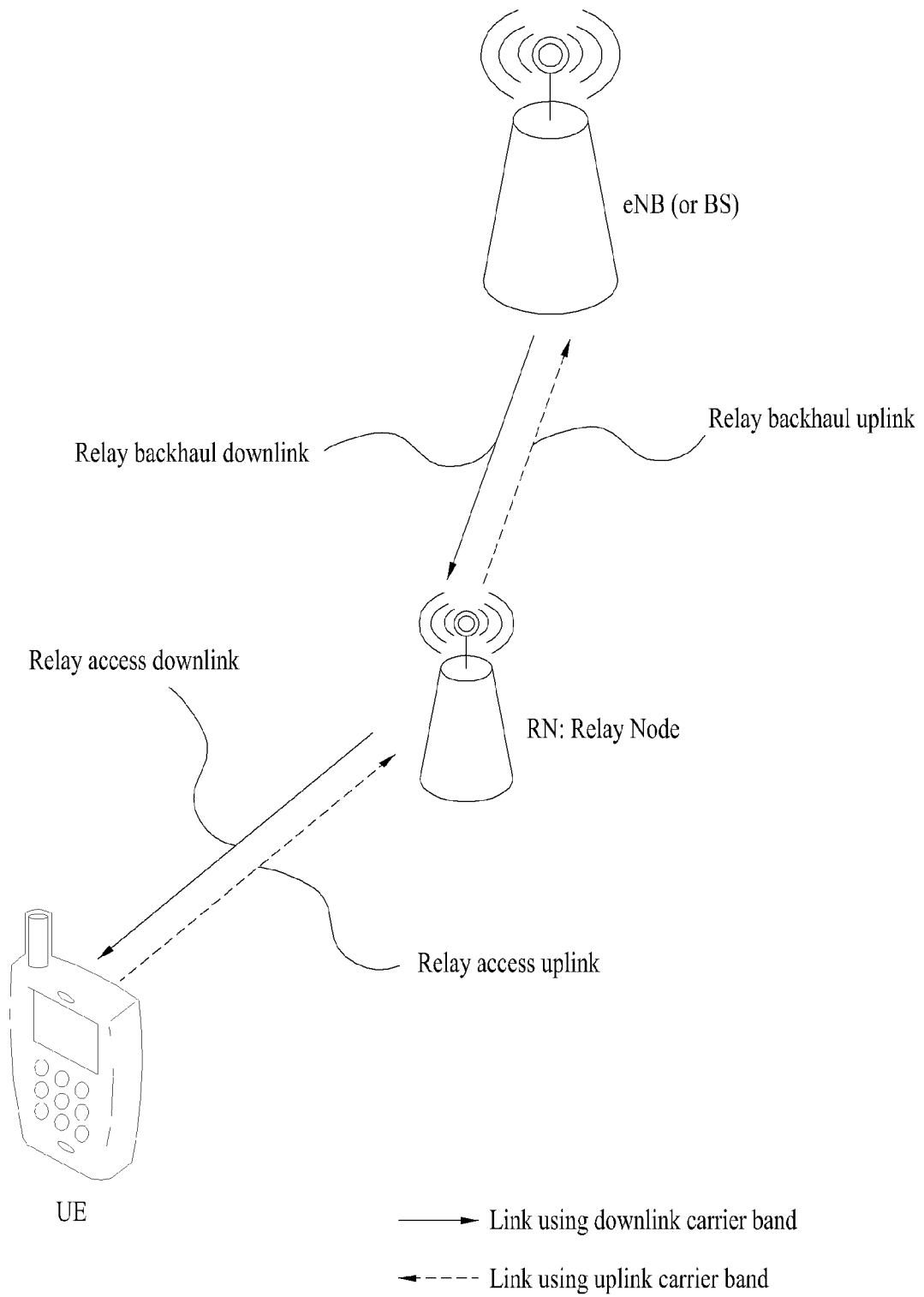
FIG. 6 is a conceptual diagram illustrating a relay backhaul link and a relay access link for use in a wireless communication system.

FIG. 6 is a conceptual diagram illustrating a relay backhaul link and a relay access link for use in a wireless communication system.

Referring to FIG. 6, as the relay node (RN) is introduced to perform forwarding of link connection between the BS and the UE, two links having different attributes are applied to a UL carrier frequency band and a DL carrier frequency band. The connection link between the BS and the RN is defined as a backhaul link. Transmission of a backhaul link using either resources of a downlink frequency band (i.e., the case of Frequency Division Duplex (FDD)) or resources of a downlink subframe (i.e., the case of Time Division Duplexing (TDD)) is referred to as backhaul downlink. Transmission of backhaul link using either resources of an uplink frequency band (i.e., the case of FDD) or resources of an uplink subframe (i.e., the case of TDD) is referred to as backhaul uplink.

On the other hand, the connection link between the relay node (RN) and a series of UEs is defined as a relay access link. If the relay access link is transmitted using resources of the downlink frequency band (i.e., the case of FDD) or resources of a downlink subframe (i.e., the case of TDD), the above-mentioned transmission operation is denoted by an access downlink. Otherwise, if the relay access link is transmitted using resources of the uplink frequency band (i.e., the case of FDD) or resources of an uplink subframe (i.e., the case of TDD), the above-mentioned transmission operation may be represented by an access uplink.

The RN may receive information from the BS through a relay backhaul downlink, and may transmit information to the BS through a relay backhaul uplink. In addition, the relay node may transmit information to the UE through the relay access downlink, or may receive information from the UE through the relay access uplink.

Meanwhile, in association with the band (or spectrum) of the relay node (RN), one case in which the backhaul link operates in the same frequency band as in the access link is referred to as 'in-band', and the other case in which the backhaul link operates in a frequency band different from that of the access link is referred to as 'out-band'. In the above-mentioned two cases of in-band and out-band, it is necessary for a UE (hereinafter referred to as a legacy UE) that is operated in the legacy LTE system (for example, Release-8) to access a donor cell.

Relay nodes (RNs) can be classified into a transparent RN and a non-transparent RN according to whether or not the UE recognizes the RN. The transparent RN indicates an exemplary case in which it is impossible to recognize whether the UE communicates with a network through the RN, and the non-transparent RN indicates another exemplary case in which it is possible to recognize whether the UE communicates with a network through the RN.

In relation to the RN control, RNs can be classified into a relay node serving as a part of a donor cell and another relay node capable of controlling a cell alone.

Although the relay node serving as a part of the donor cell may have an RN identifier (ID), the RN does not have a unique cell identity. If Radio resource Management (RPM) is partially controlled by the BS including the donor cell (although the remaining parts of RPM are located in the RN), the above-mentioned RN is considered to be a relay node (RN) serving as a part of the donor cell. Preferably, the above-mentioned RN may support the legacy UE. For example, smart repeaters, decode-and-forward relay nodes, a variety of L2 ($2^{nd}$ layer) RNs, and Type-2 RNs may be allocated to the above-mentioned RN.

According to the relay node (RN) capable of controlling the cell alone, this RN controls one or more cells, provides a unique physical layer cell identity to each cell controlled by the RN, and is able to use the same RPM mechanism. From the viewpoint of the UE, there is no difference between accessing a cell controlled by the RN and accessing a cell controlled by a general BS. Preferably, cells controlled by the above-mentioned RNs may support the legacy UE. For example, a Self-backhauling RN, L3 ($3^{rd}$ layer) RN, Type-1 RN, and Type-1a RN may be allocated to the above-mentioned RN.

The Type-1 RN controls a plurality of cells using In-band RN, and the UE considers each cell to be a separate cell distinguished from the donor cell. In addition, several cells are assigned respective physical cell IDs (defined in LTE Release-8), and the RN may transmit its own synchronization channel, a reference signal, and the like. In the case of single-cell operation, the UE can directly receive scheduling information and HARQ feedback from the RN, and can transmit its own control channel information (scheduling request (SR), CQI, ACK/NACK, etc.) to the RN. In addition, the legacy UE (that is operated according to LTE Release-8) considers Type-1 RN to be a legacy BS (that is operated according to LTE Release-8). That is, the Type-1 RN has backward compatibility. On the other hand, from the viewpoint of a UE that is operated according to the LTE-A system, the Type-1 RN is considered to be different from the legacy BS, resulting in improved performance or throughput.

The Type-1a RN is operated in the out-band, and has the same characteristics as those of the Type-1 RN. The Type-1a RN operation may be configured to minimize (or eliminate) the influence of L1 ($1^{st}$ layer) operation.

The Type-2 RN may be an In-band RN, does not have a separate physical cell ID, and does not form a new cell. The Type-2 RN considers the legacy IE to be transparent, and the legacy UE is unable to recognize the presence of the Type-2 RN. Although the Type-2 RN transmits PDSCH, it should be noted that the Type-2 RN does not transmit CRS and PDCCH.

On the other hand, in order for the RN to operate in the in-band, some resources for use in the time-frequency domains must be reserved for a backhaul link and these resources may not be used for the access link. The above-mentioned resource definition is called 'resource partitioning'.

General principles related to resource partitioning in the relay node (RN) will be given below. The backhaul downlink and the access downlink can be multiplexed in one carrier frequency according to the Time Division Multiplexing (TDM) scheme (that is, only one of the backhaul downlink and the access downlink can be activated at a specific time). Similar to this, the backhaul uplink and the access uplink can be TDM-multiplexed in one carrier frequency according to the TDM scheme (that is, only one of the backhaul uplink and the access uplink can be activated at a specific time).

In association with the backhaul link multiplexing based on the FDD scheme, backhaul downlink transmission is carried out in a downlink frequency band, and backhaul uplink transmission is carried out in an uplink frequency band. In association with the backhaul link multiplexing based on the TDD scheme, backhaul downlink transmission is carried out in a downlink subframe of the BS and the RN, and backhaul uplink transmission is carried out in an uplink subframe of the BS and the RN.

In the case of In-band RN, provided that backhaul downlink is received from the BS within a predetermined frequency band and at the same time access downlink is transmitted to the UE within the same frequency band, a signal transmitted from the transmitter of the RN may be received from the receiver of the RN, such that signal interference or RF jamming may occur in the RF front-end of the RN. Similar to this, assuming that the access uplink is received from the UE within a predetermined frequency band and at the same time the backhaul uplink is transmitted to the BS within the same frequency band, signal interference may occur in the RF front-end of the RN. Therefore, the present invention has difficulty in implementing simultaneous transmission/reception within one frequency band of the RN on the condition that a reception (Rx) signal and a transmission (Tx) signal are not spaced apart from each other (for example, the Tx antenna and the Rx antenna are not geographically spaced apart from each other (e.g., one of the Tx and Rx antennas is installed on the ground one is installed underground)).

A method for obviating the above-mentioned signal interference controls the RN not to transmit a signal to the UE while the RN receives a signal from the donor cell. In other words, a gap may occur in transmission from the RN to the UE, and the UE (including the legacy UE) may be set not to receive any data from the RN during the gap. The above-mentioned gap may be established by constructing a Multicast Broadcast Single Frequency Network (MBSFN) subframe.

Figure 7:
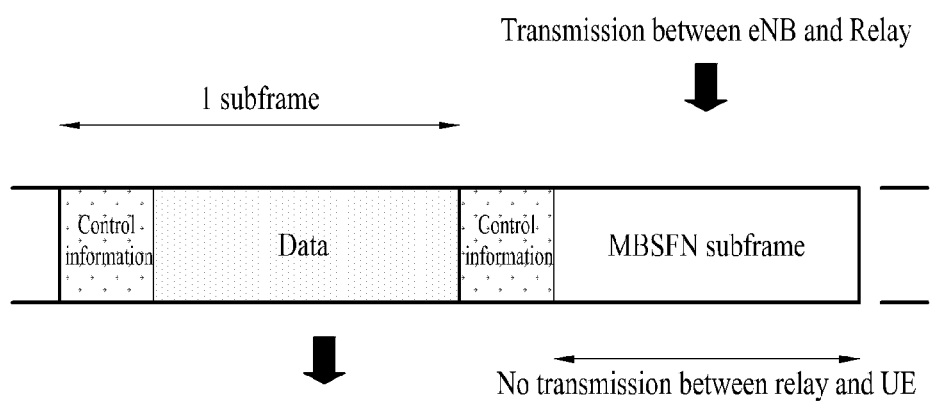
FIG. 7 is a diagram showing an example of relay node resource partitioning.

FIG. 7 illustrates an example of relay node (RN) resource partitioning.

Referring to FIG. 7, the first subframe is a general subframe, and transmits a downlink (i.e., an access downlink) control signal and data from the RN to the UE. The second subframe is an MBSFN subframe. While a control signal is transmitted from the RN to the UE in the control region of the downlink subframe, no signal is transmitted from the RN to the UE in the remaining region of the downlink subframe. Here, since the legacy UE expects transmission of PDCCH through all downlink subframes (that is, it is necessary for legacy UEs contained in the RN coverage to receive PDCCH at every subframe and then perform a measurement function), it is necessary for the PDCCH to be transmitted through all the downlink subframes in order for each legacy UE to be correctly operated. Therefore, on a subframe (i.e., a second subframe) established for downlink (i.e., backhaul downlink) transmission from the BS to the RN, the RN needs to perform transmission of access downlink instead of reception of backhaul downlink in the first N OFDM symbols (N=1, 2 or 3). In this case, since PDCCH is transmitted from the RN to the UE in the control region of the second subframe, the RN can provide backward compatibility for the serving legacy UE. While no signal is transmitted from the RN to the UE in the remaining regions of the second subframe, the RN can receive data or signals from the BS. Therefore, the above-mentioned resource partitioning scheme can prevent the access downlink transmission and the backhaul downlink reception from being simultaneously carried out in the in-band RN.

A second subframe that utilizes the MBSFN subframe will hereinafter be described in detail. The control region of the second subframe may be referred to as a relay node (RN) non-listening interval (also called a non-hearing interval). During the RN non-listening interval, the RN can transmit an access downlink signal without receiving a backhaul downlink signal. As described above, the RN non-listening interval may include the length of one OFDM, the length of two OFDMs or the length of three OFDMs. During the RN non-listening interval, the RN transmits access downlink to the UE. In the remaining regions, the RN can receive the backhaul downlink from the BS. In this case, the RN cannot simultaneously transmit and receive data in the same frequency band, such that time is unnecessarily consumed for the RN that transitions from a transmission (Tx) mode to a reception (Rx) mode. Accordingly, it is necessary to establish a guard time (GT) in such a manner that the RN can perform Tx/Rx mode switching in some parts of the first interval of the backhaul downlink Rx region. Similar to this operation, even when the RN receives backhaul downlink from the BS and operates to transmit the access downlink to the UE, a guard time (GT) for Tx/Rx mode switching of the RN can be established. The length of such a GT may be defined as a value of a time domain. For example, the length of GT may be defined as k (k≥1) time samples (Ts) or may be set to the length of one or more OFDM symbols. Alternatively, if the RN backhaul downlink subframes are successively established, the guard time (GT) of the last part of the subframe may be defined or not established. In addition, the guard time (GT) of the last part of the subframe may also be defined or not established according to the relationship of timing alignment of a predetermined subframe. In order to maintain backward compatibility, the GT may be defined only in a frequency domain established for backhaul downlink subframe transmission (in the case where the GT is established in the access downlink interval, it is impossible to support the legacy UE). In the backhaul downlink Rx interval other than the guard time (GT), the RN is able to receive PDCCH and PDSCH from the BS. From the viewpoint of an RN dedicated physical channel, the received PDCCH and the received PDSCH may also be represented by Relay-PDCCH (R-PDCCH) and R-PDSCH (Relay-PDSCH), respectively.

Figure 8:
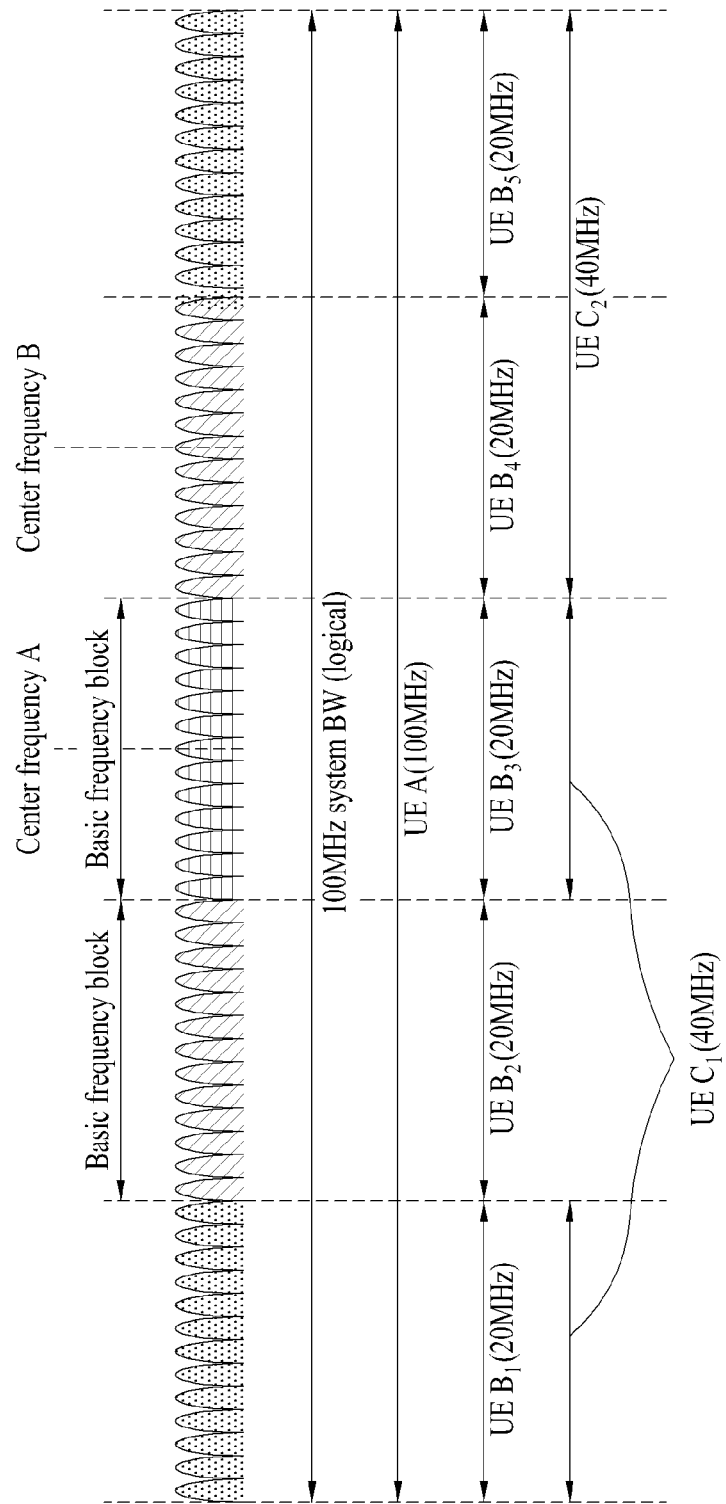
FIG. 8 is a conceptual diagram illustrating carrier aggregation (CA).

Carrier aggregation will hereinafter be described in detail. FIG. 8 exemplarily shows carrier aggregation.

Carrier aggregation refers to a method for allowing a UE to use a plurality of frequency blocks or (logical) cells, each of which is composed of uplink resources (or CCs) and/or downlink resources (or CCs), as one large logical band so as to provide a wireless communication system with a wider frequency bandwidth. For convenience of description and better understanding of the present invention, carrier aggregation will hereinafter be referred to as a component carrier (CC).

Referring to FIG. 8, the entire system bandwidth (System BW) includes a bandwidth of 100 MHz as a logical bandwidth. The entire system bandwidth (system BW) includes five component carriers (CCs) and each CC has a maximum bandwidth of 20 MHz. The CC includes one or more physically contiguous subcarriers. Although all CCs have the same bandwidth in FIG. 8, this is only exemplary and the CCs may have different bandwidths. Although the CCs are shown as being contiguous in the frequency domain in FIG. 8, FIG. 8 merely shows the logical concept and thus the CCs may be physically contiguous or separated.

Different center frequencies may be used for the CCs or one common center frequency may be used for physically contiguous CCs. For example, in FIG. 8, if it is assumed that all CCs are physically contiguous, a center frequency A may be used. If it is assumed that CCs are not physically contiguous, a center frequency A, a center frequency B and the like may be used for the respective CCs.

In the present specification, the CC may correspond to a system band of a legacy system. By defining the CC based on the legacy system, it is possible to facilitate backward compatibility and system design in a radio communication environment in which an evolved UE and a legacy UE coexist. For example, if the LTE-A system supports carrier aggregation, each CC may correspond to the system band of the LTE system. In this case, the CC may have any one bandwidth such as 1.25, 2.5, 5, 10 or 20 MHz.

In the case in which the entire system band is extended by carrier aggregation, a frequency band used for communication with each UE is defined in CC units. A UE A may use 100 MHz which is the bandwidth of the entire system band and perform communication using all five CCs. Each of UEs $B_1$ to $B_5$ may only use a bandwidth of 20 MHz and perform communication using one CC. Each of UEs $C_1$ and $C_2$ may use a bandwidth of 40 MHz and perform communication using two CCs. The two CCs may be contiguous or non-contiguous. The UE $C_1$ uses two non-contiguous CCs and the UE $C_2$ uses two contiguous CCs.

One downlink CC and one uplink CC may be used in the LTE system and several CCs may be used in the LTE-A system as shown in FIG. 8. At this time, a method of scheduling a data channel by a control channel may be divided into a linked carrier scheduling method and a cross carrier scheduling method.

More specifically, in the linked carrier scheduling method, similarly to the LTE system using a single CC, a control channel transmitted via a specific CC schedules only a data channel via the specific CC.

In contrast, in the cross carrier scheduling method, a control channel transmitted via a primary CC using a carrier indicator field (CIF) schedules a data channel transmitted via the primary CC or another CC.

Figure 9:
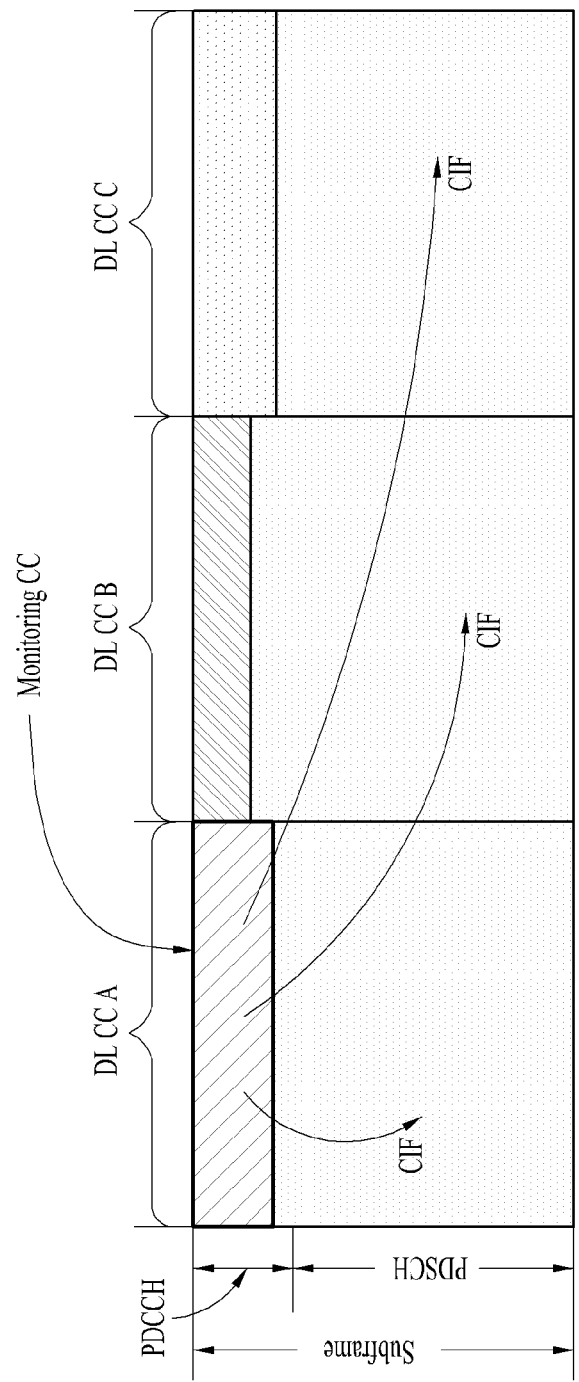
FIG. 9 is a conceptual diagram illustrating cross-carrier scheduling.

FIG. 9 is a conceptual diagram of a cross carrier scheduling scheme. Specifically, as can be seen from FIG. 9, the number of cells (or CCs) allocated to a relay node (RN) is set to 3, cross carrier scheduling is carried out using a CIF as described above. In this case, it is assumed that a downlink cell (or CC) #A is set to a primary downlink CC (i.e., a primary cell PCell), and the remaining CCs #B and #C are used as secondary cells (SCells).

The present invention provides a scheme for dynamically changing specific radio resources (for example, downlink resource or uplink resource) allocated from the eNB to the UE such that it is determined whether the specific radio resources will be used for downlink or uplink according to traffic load variation, and also provides an HARQ operation for efficiently supporting the above scheme.

First, prior to describing detailed description of the proposed schemes, uplink-downlink configuration defined in the 3GPP LTE—based TDD system will hereinafter be described in detail.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D, U and S are allocated respective subframe numbers. In more detail, D denotes a downlink subframe, U denotes an uplink subframe, and S denotes a switching point. In addition, the following Table 2 shows an uplink subframe number (index) for controlling a UE to transmit uplink ACK/NACK of the corresponding downlink signal in the 3GPP LTE system.

TABLE 2

| UL-DL Configuration | subframe number | | | | | | | | | |
|---|---|---|---|---|---|---|---|---|---|---|
| | 0 | 1 | 2 | 3 | 4 | 5 | 6 | 7 | 8 | 9 |
| 0 | 4 | 7 | — | — | — | 9 | 2 | — | — | — |
| 1 | 7 | 7 | — | — | 8 | 2 | 2 | — | — | 3 |
| 2 | 7 | 7 | — | 7 | 2 | 2 | 2 | — | 2 | 7 |
| 3 | 4 | 2 | — | — | — | 2 | 2 | 3 | 3 | 4 |
| 4 | 2 | 2 | — | — | 2 | 2 | 3 | 3 | 3 | 3 |
| 5 | 2 | 2 | — | 2 | 2 | 2 | 2 | 2 | 2 | 2 |
| 6 | 7 | 8 | — | — | — | 2 | 3 | — | — | 4 |

Specifically, in Table 2, '-' indicates configuration of an uplink subframe, and a number allocated to each subframe number indicates an uplink subframe index. That is, '-' indicates an uplink subframe index interlocking with the corresponding downlink subframe.

Figure 10:
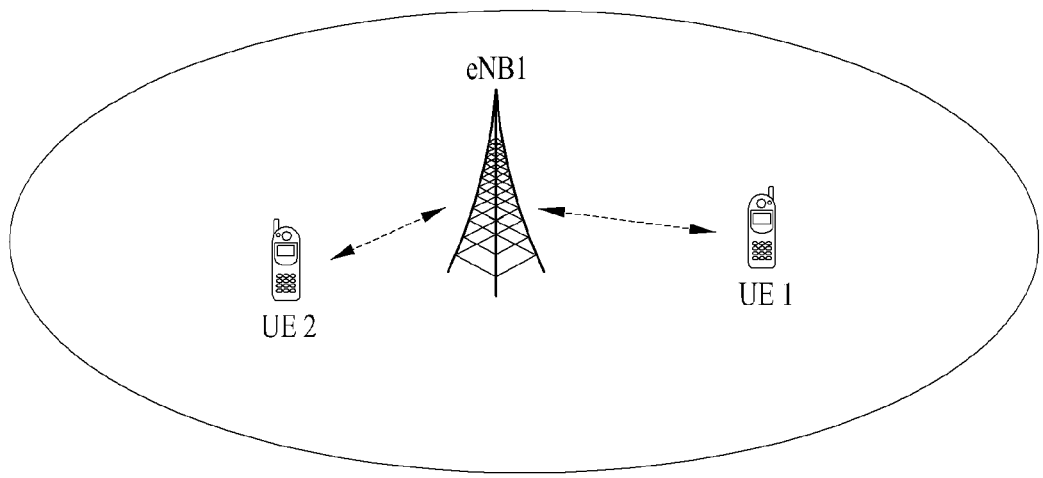
FIG. 10 is a conceptual diagram illustrating that UEs of a cell are operated according to a specific UL-DL configuration in an LTE-based TDD system.

FIG. 10 is a conceptual diagram illustrating that UEs of a cell are operated according to a specific UL-DL configuration in an LTE-based TDD system. Specifically, FIG. 10 assumes that UEs are operated in uplink-downlink configuration #0.

The present invention provides the following operation schemes when downlink traffic load to be transmitted to UE1 increases under the situation of FIG. 10.

First Embodiment

A first embodiment of the present invention provides a method for dynamically changing specific radio resources (for example, downlink resource or uplink resource) allocated to a UE using a specific field of control information transmitted over a physical control channel as an indicator, such that it is determined whether the specific radio resources will be used for downlink or uplink according to traffic load variation. In this case, the specific field may correspond to a reuse of a legacy field, or may be newly defined and used. For example, the legacy field may be a Carrier Indication Field (CIF), a Downlink Assignment Index (DAI), or UL index (index), etc.

1) For example, the eNB transmits DL assignment information for dynamic change of the usage of specific radio resources. The legacy CIF is set to a specific state (for example, a reserved state), such that the legacy CIF may be used as an indicator for changing dynamic change of the usage of specific radio resources.

The UE recognizes a usage of specific radio resources, such that it performs DL or UL operations according to the corresponding DL assignment information (for example, downlink control information or uplink control information). CIF is originally used for Cross Carrier Scheduling (CCS). Assuming that a UL resource is considered as another cell or another component carrier (CC) from the viewpoint of DL resources, or assuming that a DL resource is considered as another cell or another CC from the viewpoint of UL resources, this means execution of CCS.

2) In another example, additional downlink assignment information is allocated, and dynamic change of the usage of a specific radio resource may be indicated using a predefined bit size, for example, a DAI field of 2 bits.

For example, the eNB assigns not only downlink assignment information for PDSCH transmitted at DL SF #n, but also additional downlink assignment information to a specific UE. Intentionally, the DAI value is set to (m+k) (where, k is a positive (+) or negative (−) integer) instead of a normal value (for example, m), such that it may indicate dynamic change of the use of specific radio resources.

In more detail, when SF #n, SF #(n+1), and SF #(n+2) are set to D, S, and U, respectively, and UL ACK/NACK for the configured downlink SFs {i.e., SF #n and SF #(n+1)} is transmitted through one predefined UL SF #(n+k), assuming that an indicator for changing the use of UL SF #(n+2) and the corresponding downlink assignment information is received at SF #(n+1), a DAI value of SF #(n+1) does not exceed the value of 1 under the normal operation (i.e., DAI is set to 1 at SF #0, DAI is set to 1 at SF #(n+1)). If the DAI value of SF #(n+1) is set to 2 or 3, it can be understood that the legacy defined UL SF #(n+2) is changed to DL SF #(n+2).

That is, if the DAI value is set to a predetermined value or higher (for example, a maximum number of PDSCH transmission times at DL subframes interlocking with each other to transmit HARQ (UL) ACK/NACK signals in a single UL subframe), this means that the use of a legacy uplink subframe located at a specific location is changed to the use of a downlink subframe.

3) Meanwhile, assuming that a specific radio resource allocated for the legacy UL usage is changed to DL usage using the indicator such as CIF or DAI (or UL index), a transmission time point of the UL grant for scheduling legacy UL resources may be re-used as the reception time of the corresponding indicator. Accordingly, the subframe index indicator of a subframe at which the separate use change is achieved is no longer required.

4) In addition, assuming that a specific radio resource allocated for the legacy UL use is changed to DL usage using the indicator such as CIF or DAI (or UL index), the reception time of the corresponding indicator may use "available DL SF (or DL standalone SF) satisfying DL SF #x (where, x≤(y−4))" or "available DL SF #q (or DL standalone SF #q) closest to UL SF #y (where, q<y or q≤y, q=integer)" at a location of a specific radio resource allocated for legacy UL usage. In this case, "available DL SF" denotes a DL SF configured by UL-DL configuration, and "DL standalone SF" denotes a DL SF through which a UL grant for UL SF of a specific time is not transmitted. However, assuming that the UL grant is not received at a time of (predefined) DL SF through which the UL grant for UL SF #y is received, it may be assumed that the UE can transmit DCI information including the above indicator in such a manner that the BS changes the corresponding SF to another usage (i.e., DL communication usage) at UL SF #y and uses the changed result. Therefore, the UE may perform a BD for receiving specific information (or indicator) indicating the usage change of the corresponding SF at UL SF #y on the basis of the above-mentioned assumption. In this case, the above-mentioned operation may be performed by the UE and BS configured to share some rules (or information) in advance.

In addition, assuming that "available DL SF #9 (or DL standalone SF #q) (where q<y or q≤y, q=integer) closest to UL SF #y" is used as the reception time of the corresponding indicator, the DAI field can be appreciated as "SF index indicator" for indicating the location of a radio resource, the use of which is changed (that is, UL use may be changed to DL use or DL use may be changed to UL use).

When the use of predefined radio resources is changed to another use using the above-mentioned 1) and 2) schemes, PDCCHs (DL grant) for PDSCH scheduling of the corresponding SF and another SF (for example, DL SF #n) and PDCCH (UL grant) for PUSCH scheduling must be simultaneously transmitted at one DL SF (for example, DL SF #g), such that the additional search space is needed and a maximum number of blind decoding (BD) times may increase.

On the contrary, when the use of the predefined radio resources is changed using the above-mentioned 3) and 4) schemes, PDCCHs (DL grant) for PDSCH scheduling of the corresponding SF and another SF are transmitted using a DL SF (for example, DL standalone SF) through which a PDCCH (UL grant) for PUSCH scheduling is not transmitted, a search region is not extended and a maximum number of blind decoding (BD) times is not increased. However, the above-mentioned operation may be efficient on the assumption that the probability of PDCCH blocking is maintained.

In addition, assuming that the change of a radio resource use is indicated using the above-mentioned scheme (1), three CIF states are established, the eNB may inform the UE of specific information as to whether a specific PDSCH is transmitted at DL SF or UL SF only or at both of DL SF and UL SF through (one) PDCCH including the above indicator.

The above-mentioned operation may be possible by sharing associated information between the UE and the BS in advance. For example, a first case in which a specific PDSCH is transmitted only at UL SF, a second case in which a specific PDSCH is transmitted at both of DL SF and UL SF, and a third case in which a legacy UL radio resource is changed to DL radio resource may correspond to the case of sharing associated information between the UE and the BS.

Meanwhile, when using the above-mentioned schemes, the uses of multiple radio resources can be simultaneously changed at DL SF #t.

For example, when using the above-mentioned schemes 1) and 2), two or more CIF or DAI (or UL index) values indicating the change of a specific radio resource are established, and multiple DL assignment information pieces having such CIF or DAI (or UL index) values may also be indicated.

In addition, when using the scheme (3) in which a transmission time point of a UL grant for scheduling legacy UL resources is reused as a reception time of the corresponding indicator without change, assuming that the UE receives DL assignment information including indicators for changing the use of specific radio resources at DL SF #t (however, it is assumed that UL SF interlocking with DL SF #t is UL SF #(t+a) (however, a≥4, a=integer)), the BS may recognize that the uses of available UL SFs starting from UL SF #(t+a) are sequentially changed in ascending or descending numerical order. In this case, the number of all UL SFs, the use of which is changed, may be identical to a total number of the received usage change indicators. In this case, "available UL SF" may indicate a UL SF configured by uplink-downlink configuration, or may indicate a UL SF in which PUSCH transmission actually occurs in specific uplink-downlink configuration.

In addition, prior to using a dynamic subframe configuration scheme of the first embodiment, the eNB may inform the UE of such operation achieved through higher layer signaling.

In addition, if UL SF is changed to DL SF according to a first embodiment for use in the TDD system, only a UL SF (that is, a subframe corresponding to U when a subframe configuration is denoted by UD) located ahead of the DL SF may be used in a restricted manner. Such restriction may allow DL SF transmitted from the eNB to the UE to experience propagation delay, and timing advance is applied to a UL SF transmitted from the UE to the eNB in consideration of the propagation delay, because an overlap region may occur between a DL SF and a UL SF in the other case (for example, a subframe corresponding to a front side U when the subframe configuration is denoted by UU) other than the case of the UL SF located ahead of a DL SF from the viewpoint of the UE.

Figure 11:
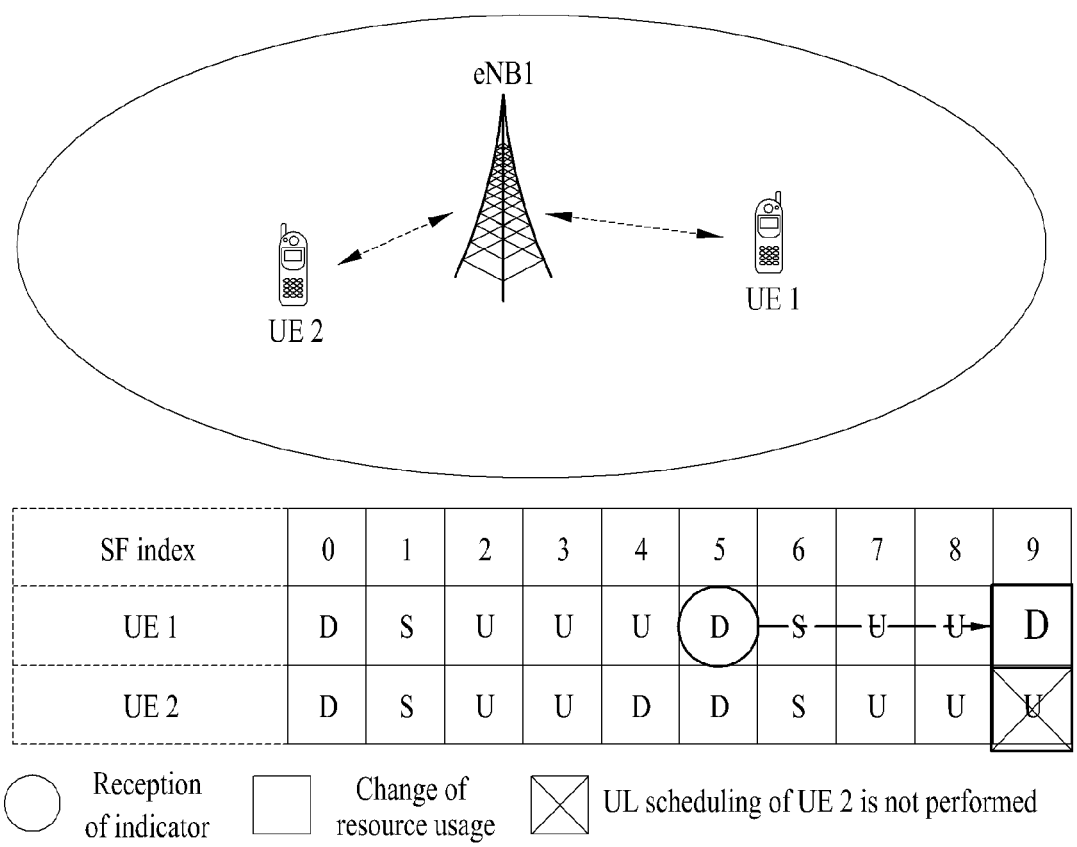
FIG. 11 is a conceptual diagram illustrating a method for setting a dynamic subframe according to a first embodiment of the present invention.

FIG. 11 is a conceptual diagram illustrating a method for setting a dynamic subframe according to a first embodiment of the present invention. Specifically, assuming that downlink traffic load of a UE 1 is increased under the same situation as in FIG. 10, FIG. 11 shows that a legacy UL SF is changed to a DL SF using the dynamic subframe setting scheme according to the first embodiment.

It is assumed that the above-mentioned method (1) is changed for dynamic change of the use of a specific radio resource. For example, it is assumed that DL assignment information in which the CIF value is set to 001 may indicate that the legacy UL SF is changed to DL SF. In addition, the reception time of the corresponding CIF value may also be set to a transmission time of the UL grant for scheduling legacy UL resources in the same manner as in the above-mentioned scheme (3) without change.

Referring to FIG. 11, eNB 1 indicates that DL assignment information is transmitted at DL SF #5 at which the UL grant regarding UL SF #9 is transmitted, CIF is set to 001 such that CIF "001" may inform UE 1 of specific information indicating that the use of UL SF #9 is changed to DL resources instead of UL resources, and at the same time scheduling information transmission of the corresponding DL resource is performed.

When the above-mentioned operations are performed, PUSCH transmission of a UE 2 at UL SF #9 may receive mushy interference because UL transmission and DL transmission are simultaneously generated at the same time. Therefore, the eNB 1 may restrict uplink scheduling for PUSCH transmission at UL SF #9 of UE 2.

Second Embodiment

Second embodiment provides the HARQ operation method for use in the case in which a dynamic subframe configuration method is used according to the above-mentioned first embodiment.

a) If UL SF #n acting as a UL resource is changed to a DL resource, UL ACK/NACK of such DL resources may be transmitted through the nearest available UL SF satisfying UL SF #(n+k) (however, k≥4, and k=integer).

UL ACK/NACK of legacy DL resources linked for transmission of UL ACK/NACK through UL SF #n may also be transmitted at the nearest available UL SF satisfying UL SF #(n+p) (however, p≥1 and p=integer).

In this case, "available UL SF" may indicate i) a UL SF to be used for transmission of the legacy UL ACK/NACK, or may indicate ii) all UL SFs configured by uplink-downlink configuration. For example, as can be seen from FIG. 11, assuming that the available UL SF indicates a UL SF to be used for legacy UL ACK/NACK transmission, DL SF #5 of UE 1 and UL ACK/NACK of DL SF #9 are transmitted at UL SF #2 and UL SF #4, respectively. However, if the available UL SF indicates all UL SFs configured by uplink-downlink configuration, UL ACK/NACK of DL SF #5 of UE 1 and UL ACK/NACK of DL SF #9 of UE 1 are transmitted at UL SF #2 and UL SF #3, respectively.

b) Alternatively, assuming that UL SF #n composed of UL resources by legacy UL-DL configuration #x is changed to a DL resource such that it is composed of DL SF #n, UL ACK/NACK of DL SF #n may follow a transmission time of UL ACK/NACK of UL-DL configuration #y that satisfies all or some (predefined) specific conditions in all the candidate sets (i.e., UL-DL configurations #0~#6 in Table 2) denoted by UL-DL configuration. In addition, UL ACK/NACK may also follow a transmission time of UL-DL configuration #y that satisfies one or two conditions.

In this case, the following conditions (1), (2), and (3) may be used as exemplary conditions, i.e., (1) UL-DL configuration in which the corresponding UL SF #n is allocated to DL SF #n, and (2) UL-DL configuration in which UL SF #m to be used as UL ACK/NACK of DL SF #n is necessarily denoted by the available UL SF in the legacy UL-DL configuration #x. Likewise, "available UL SF" may indicate i) a UL SF to be used for legacy UL ACK/NACK transmission, and ii) all UL SFs configured by UL-DL configuration.

In addition, as a reference for selecting UL-DL configuration #y that satisfies some or all of the above conditions, UL-DL configuration that causes minimum influence upon the HARQ timing or ACK/NACK transmission scheme of the legacy UL-DL configuration #x may be primarily selected. As another selection reference of UL-DL configuration #y, SFs ranging from (changed) DL SF #m (or legacy UL SF #n) to UL SF #m (however, m≥(n+4)) is satisfied, and UL-DL configuration capable of providing the fastest UL ACK/NACK time point may be first selected.

In accordance with another selection reference of UL-DL configuration #y, UL-DL configuration in which only the corresponding UL SF #n is allocated to DL SF #n may be first selected, that is, the same UL-DL configuration may be first selected as a configuration of the remaining SFs other than UL SF #n.

If UL-DL configuration does not exist, UL-DL configuration having the most similar subframe configuration may be first (sequentially) selected, or UL-DL configuration that guarantees the fastest UL ACK/NACK transmission satisfying SFs ranging from SF #n to UL SF #m (however, m≥(n+4)) may be first selected.

Furthermore, assuming that DL SF #n composed of UL resources by legacy UL-DL configuration is changed to a DL resource such that the DL resource is composed of DL SF #n, the individual or entire UL ACK/NACK time configuration of legacy DL resources associated to transmit UL ACK/NACK through UL SF #n may be applied.

Third Embodiment

A) Meanwhile, according to a third embodiment, additional UL-DL configuration for UL ACK/NACK timing may be signaled to a UE that has a high probability in which UL SF #n is changed to DL SF #n under the legacy UL-DL configuration #x.

Although the above-mentioned scheme can allow the eNB to dynamically indicate the usage change of UL SF #n, that acts as a specific radio resource based on the legacy UL-DL configuration #x allocated to System Information Block (SIB), through a CIF or DAI (or UL index) of a physical control channel, the above-mentioned scheme can solve the confusion problem of the usage of UL SF #n between the eNB and the UE, wherein the confusion problem can be solved when the UE does not receive the indicator and the corresponding DL assignment information.

Figure 12:
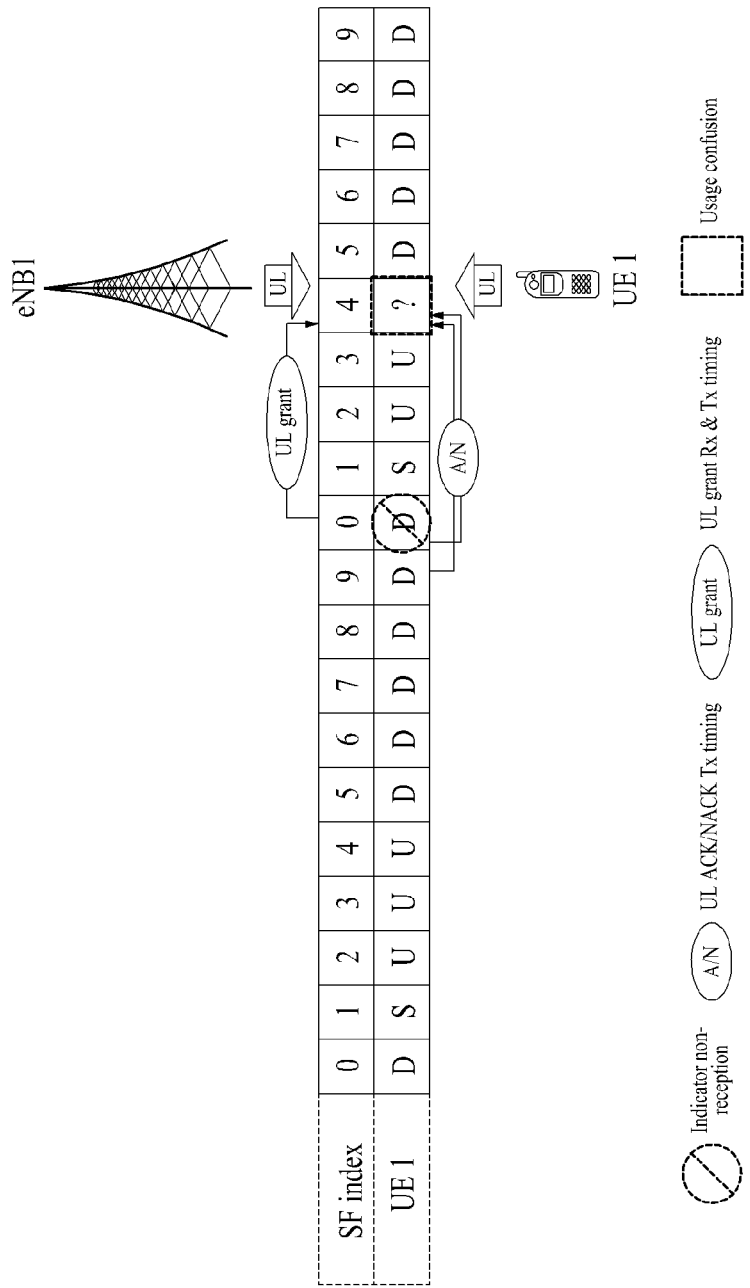
FIG. 12 is a conceptual diagram illustrating a situation to which a third embodiment is applied.

FIG. 12 is a conceptual diagram illustrating a situation to which a third embodiment is applied. Specifically, FIG. 12 shows a confusion problem of the usage of UL SF #n between the eNB and the UE, where the confusion problem may occur when the UE does not receive the indicator and the corresponding DL assignment information.

In addition, the legacy UL-DL configuration designated by SIB may be UL-DL configuration #3, and it is assumed that the above-mentioned method of the first embodiment is applied for dynamic change of the usage of a specific radio resource. That is, it is assumed that DL assignment information having the CIF value of "001" indicates that the usage of the legacy UL SF is changed to the usage of DL SF. In addition, it is assumed that a transmission timing point of the UL grant for scheduling the legacy UL resources may be reused as the reception time of the corresponding CIF value in the same manner as in the scheme (3) of the first embodiment.

Referring to FIG. 12, although not only the indicator for changing the usage of UL SF #4 to the usage of DL SF #4, but also the corresponding DL assignment information has been transmitted at DL SF #0, assuming that the UE does not receive the above indicator and the corresponding DL assignment information, the eNB is ready to perform DL communication at DL SF #4 and the UE is ready to perform UL communication at UL SF #4 or does not expect to perform DL communication with the eNB, resulting in the occurrence of communication confusion between the eNB and the UE.

That is, since the eNB has transmitted the above indicator and the corresponding DL assignment information through DL SF #0, the usage of SF #4 is set to DL SF #4 for DL data transmission. In contrast, since the UE does not receive the above indicator and the corresponding DL assignment information, the usage of SF #4 is considered as UL SF #4 for UL ACK/NACK transmission according to the legacy UL-DL configuration designated by SIB, and then operates.

Accordingly, assuming that the eNB may inform the UE of additional UL-DL configuration #4 for the UL ACK/NACK timing point through higher layer signaling, the UE may transmit UL ACK/NACK of DL SF #0 and DL SF #9 through UL SF #2 and UL SF #3 based on UL-DL configuration #4, but not through UL SF #4 based on the legacy UL-DL configuration #3. That is, UL ACK/NACK of DL SF #0 may be transmitted at UL SF #2, UL ACK/NACK of DL SF #9 may be transmitted at UL SF #3, and UL ACK/NACK of DL SF #4 may be transmitted at UL SF #2.

Therefore, although the UE does not receive not only the indicator indicating the usage change of SF #4 transmitted from the eNB, but also the corresponding DL assignment information at DL SF #0, the UE and the eNB do not perform UL communication and DL communication different from each other at SF #4.

However, assuming that the UL grant for UL SF #4 is received at DL SF #0, UL data can be transmitted at UL SF #4 according to the corresponding UL grant. As another scheme for supporting such operation, the above-mentioned additional UL-DL configuration is applied only to the relationship of UL ACK/NACK transmission time lines of PDSCH from among DL HARQ signals, and the remaining HARQ-associated operation (for example, UL grant or PHICH reception time line, or the relationship of PUSCH transmission time lines based on the UL grant or the PHICH reception time line) may be operated according to the UL-DL configuration defined in the legacy SIB.

B) In addition, assuming that "UE A configured to transmit UL ACK/NACK according to UL ACK/NACK timing point of the legacy UL-DL configuration #3 designated by SIB" and "UE B configured to transmit UL ACK/NACK using the additionally signaled UL-DL configuration #4 according to the above-mentioned scheme (A)" coexist, UL ACK/NACK of DL SF #7 and DL SF #8 of UE A may overlap with UL ACK/NACK of DL SF #9 of UE B at UL SF #3. That is, efficient multiplexing may not be achieved between PUCCH resources of UE A and UE B, or the probability of causing collusion between PUCCH resources may increase.

In this case, assuming that UEs configured to use different ACK/NACK timing points transmit UL ACK/NACK through a common UL SF, the eNB may differently assign the lowest CCE index used for transmission of DL assignment information for each interlocked DL SF, such that the eNB may prevent collision between PUCCH resources at a common UL SF. Under the dynamic PUCCH resource assignment scheme, the PUCCH resource is assigned on the basis of the lowest CCE index used for DL assignment information transmission per DL SF, such that the eNB can prevent the occurrence of collision between PUCCH resources at the common UL SF.

For example, assuming that UL ACK/NACK is transmitted at a common UL SF using the PUCCH format 1/1a/1b, the lowest CCE index used for DL assignment information transmission per DL SF is differently assigned such that collision between PUCH resources can be prevented from occurring. However, assuming that UL ACK/NACK is transmitted at a common UL SF using PUCCH format 3, the collision of PUCCH resources at a common UL SF can be prevented from occurring using ACK/NACK resource indicator (ARI) signaled through a higher layer.

In addition, assuming that UEs configured to use different ACK/NACK timing points coexist and transmit UL ACK/NACK through a common UL SF, when the ACK/NACK multiplexing scheme or the channel selection scheme are used, not only specific information indicating which one of ACK/NACK resource mapping tables will be used, but also the rule indicating how to perform mapping between HARQ-ACK(i) and ACK/NACK resource can be predefined or pre-exchanged between the eNB and the UE. In this case, (i) is a parameter indicating the number of DL SFs interlocking with UL SF.

Finally, the UE operated according to the scheme A) or B) of the third embodiment may transmit UL ACK/NACK according to the UL ACK/NACK timing point of additional UL-DL configuration signaled by the eNB for the UL ACK/NACK timing, and may perform operations of a UL grant or a PHICH reception time line or may also perform the same operation as in the PUSCH transmission time line according to the legacy UL-DL configuration defined in the legacy SIB.

Although the third embodiment has proposed a method for enabling the eNB to separately signal the additional UL-DL configuration for the relationship between PDSCH and UL ACK/NACK, the scope or spirit of the present invention is not limited thereto and can also be applied to other examples. More specifically, according to a general HARQ operation, the third embodiment may also include a method for commanding a specific part (for example, UL ACK/NACK transmission time line, UL grant and PHICH transmission time line, or PUSCH transmission time line based on UL grant and PHICH) to operate according to the additional UL-DL configuration signaled differently from the HARQ timing point defined in the legacy UL-DL configuration.

For example, the eNB may inform the UE of the UL-DL configuration different from that of SIB through higher layer signaling, may indicate the relationship between reception of a UL grant defined in the corresponding UL-DL configuration and a PUSCH transmission start time, or may indicate the relationship between the PHICH reception and the PUSCH transmission start time. Similarly, additional UL-DL configuration may be signaled, and this signaling information may be applied to the relationship between the PUSCH transmission time and the PHICH reading time as necessary.

In another scheme, for measurement usages of RSRQ, RSRP, and RLM, the eNB and the UE may be operated only according to the legacy UL-DL configuration designated by SIB. That is, the measurement process may be performed only at DL SF based on the legacy UL-DL configuration #x. In this case, DL SF based on the legacy UL-DL configuration #x may be limited to DL SF based on the legacy UL-DL configuration #x having the unchanged usage.

Fourth Embodiment

If a specific radio resource allocated to the UE according to the first to third embodiments is dynamically changed through the indicator indicating whether the specific radio resource will be used for DL or UL, the legacy ACK/NACK transmission scheme may be further changed. For example, the legacy ACK/NACK transmission scheme may be changed and modified according to "the used or unused state" and "application position" of the first to third embodiments.

Figure 13:
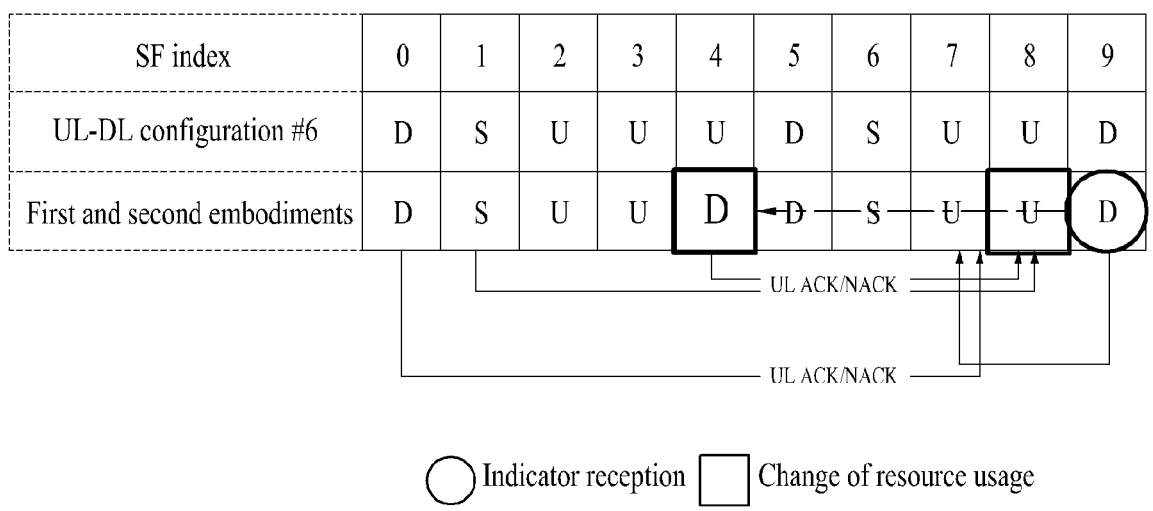
FIG. 13 is a conceptual diagram illustrating a modification example of the ACK/NACK transmission scheme when a dynamic subframe configuration scheme is applied to the above-mentioned embodiments.

FIG. 13 is a conceptual diagram illustrating a modification example of the ACK/NACK transmission scheme when a dynamic subframe configuration scheme is applied to the above-mentioned embodiments. Specifically, FIG. 13 assumes that the method (1) of the first embodiment is applied for dynamic change of the usage of specific radio resources. That is, it is assumed that DL assignment information in which the CIF value is set to "001" indicates that the legacy UL SF is changed to a DL SF. In addition, it is assumed that a transmission timing point of the UL grant for scheduling the legacy UL resources may be reused as the reception time of the corresponding CIF value in the same manner as in the scheme (3) of the first embodiment. In addition, FIG. 13 assumes that UL-DL configuration #6 is established through SIB for convenience of description and better understanding of the present invention.

Referring to FIG. 13, the eNB transmits DL assignment information at DL SF #9 indicating a transmission time of the UL grant of UL SF #4, such that the eNB may inform the UE of specific information indicating that the usage of UL SF #4 is changed to a DL resource but not a UL resource, and at the same time transmits scheduling information of the corresponding DL resources. In addition, it can be recognized that UL ACK/NACKs of DL SF #4 and DL SF #9 of the UE are respectively transmitted at UL SF #8 and UL SF #7 according to a second embodiment. In this case, it is assumed that the available UL SF of the second embodiment may indicate a UL SF to be used for transmission of the legacy UL ACK/NACK.

In this case, since the ratio of one UL SF to a DL SF according to the above-mentioned UL-DL configuration #6 is set to 1:1, UL ACK/NACK transmission is achieved through PUCCH format 1a/1b. However, when using the first and second embodiments (or the third embodiment), the ratio of one UL SF to a DL SF may not be set to 1:1 any more, such that the legacy ACK/NACK transmission scheme needs to be changed to another transmission scheme at PUCCH format 1a/1b. For example, it is necessary for the legacy ACK/NACK transmission scheme to be changed to the channel selection scheme or PUCCH format 3.

Therefore, assuming that a specific radio resource is dynamically changed for the DL or UL usage according to the embodiments, the UE can implicitly change the legacy ACK/NACK transmission scheme signaled through a higher layer according to a variation of the number of DL SFs interlocked with UL SF.

In this case, the changed ACK/NACK transmission scheme may be applied only to UL SF #n of a specific time at which the ACK/NACK transmission scheme is needed, or may always be applied to ACK/NACK transmission at the next UL SF #m (where m≥n) including UL SF #n. In this case, it may be possible to establish a specific rule in which the legacy ACK/NACK transmission scheme is satisfied within the maximum number of DL SFs interlocked with a UL SF supportable by the legacy ACK/NACK transmission scheme.

In more detail, the eNB may recognize whether the UE will operate according to the legacy ACK/NACK transmission scheme according to "the used or unused state" and "application position" of the above-mentioned embodiments. In this case, the changed rule to be used may be defined as "PUCCH format 1a/1b→channel selection scheme→PUCCH format 3", "PUCCH format 1a/1b→channel selection scheme→ACK/NACK bundling" or "PUCCH format 1a/1b→Channel selection scheme or ACK/NACK bundling".

In this case, ACK/NACK resources of the PUCCH format 3 is decided through higher layer signaling, such that the eNB determines a high probability of using PUCCH format 3 when the proposed schemes (for example, one of the first to third embodiments) are applied under the specific UL-DL configuration. As a result, ACK/NACK resources for PUCCH format 3 may be pre-allocated to the UE.

In association with the rule for changing the ACK/NACK transmission scheme to be used by the UE, some rules regarding the change of multiple ACK/NACK transmission schemes are pre-established between the eNB and the UE prior to using the above-mentioned embodiments, and the eNB may inform the UE of bit information corresponding to a specific rule through signaling. Alternatively, after only the rules regarding the change of one ACK/NACK transmission scheme are shared between the eNB and the UE, the eNB may inform the UE of higher layer signaling for activating the above rules as necessary.

Alternatively, assuming that the legacy ACK/NACK transmission scheme must be changed to another scheme, the legacy ACK/NACK transmission scheme may be changed only to one fixed ACK/NACK transmission scheme. For example, PUCCH format 3 is established according to a fixed one ACK/NACK transmission scheme, and the eNB may indicate in advance the corresponding ACK/NACK resources through higher layer signaling.

Fifth Embodiment

The fifth embodiment provides a detailed configuration of the subframe, the usage of which is changed according to dynamic subframe configuration.

(1) First, assuming that UL SF #n may be changed to DL SF #n, both a CRS of a control region and a CRS of a data region, or a CRS of a specific region may not be transmitted from the eNB at DL SF #n. Alternatively, a control channel such as PUCCH or the like may not be transmitted from the eNB. For example, the eNB may perform PDSCH mapping starting from a first symbol at DL SF #n at which a control channel such as PDCCH is not transmitted, or may perform PDSCH mapping starting from a pre-shared start symbol through higher layer signaling or predetermined scheme between the eNB and the UE.

In addition, due to the transmission/reception switching (or (A-)SRS transmission) of the eNB or UE, if the end symbol of the PDSCH is located before the last symbol of DL SF #n, the position of the end symbol of the PDSCH may be pre-shared through higher layer signaling or predetermined scheme.

(2) In another scheme, assuming that UL SF #n is changed to DL SF #n, the rule in which DL SF #n is operated in the form of an MBSFN subframe may be shared and established between the eNB and the UE.

(3) In still another scheme, assuming that UL SF #n is changed to DL SF #n, the eNB may inform the UE of specific information indicating that DL SF #n is operated in the form of an MBSFN subframe through additional signaling (for example, a specific field (CIF or DAI, or UL index) of a physical control channel or higher layer signaling (e.g., signaling of the size of one bit)).

The above-mentioned fifth embodiment can be applied to the first to fourth embodiments.

Sixth Embodiment

As described above, assuming that UL SF #n is changed to DL SF #n according to dynamic subframe configuration, the last one or more symbols of the corresponding DL SF #n may not be used for PDSCH transmission due to SRS transmission or Tx/Rx switching. For example, before the legacy UL SF #n is changed to DL SF #n, UL SF may be contained in cell-specific (periodic) SRS configuration (or UE-specific (periodic or aperiodic) SRS configuration).

In this case, the number of symbols incapable of being used in PDSCH mapping from among symbols of DL SF #n, or the position of the end symbol of PDSCH may be pre-shared between the eNB and the UE through higher layer signaling or predetermined scheme.

In contrast, assuming that legacy SRS transmission is not established at UL SF #n, assuming that UL data transmission is not scheduled in advance although SF #(n+1) is used for DL resources or UL resources, all symbols constructing the corresponding DL SF #n may be used for DL data transmission. In another method, assuming that UL SF #n is changed to DL SF #n, if SF #(n+1) is used as DL SF although legacy SRS transmission is established at UL SF #n, SRS transmission is not performed at the corresponding SF #n, and all symbols constructing DL SF #n may be used for transmission of DL data. The above rules may be shared between the eNB and the UE through higher layer signaling or the predetermined scheme.

Seventh Embodiment (A) As described above, if UL SF #n is changed to DL SF #n according to dynamic subframe configuration, the UE may recognize that UL grant is not transmitted at DL SF #n. Through the above-mentioned operation, the UE may reduce the probability of causing error detection of the UL grant. In addition, the above rule may be pre-shared between the UE and the eNB through higher layer signaling or the predetermined scheme.

(B) In still another method, for example, assuming that two contiguous SFs (for example, SF #(n−1) and SF #n) are established as UL resources, if the UL grant regarding SF #n is received at DL SF #(n−k) (however, k is set to 4 or another value), the UE may assume that the usage of SF #(n−1) is not changed from (legacy) UL resource to DL resource. In addition, the UE may assume that the DL grant to be used when the usage of SF #(n−1) is used as a DL resource at a time point of SF #(n−1) or (predefined) time point located before the SF #(n−1) time point is not transmitted.

(C) In addition, under the condition that two contiguous SFs (for example, SF #(n−1) and SF #n) are used for DL resources, if the usage of SF #n is changed from D1 resource to UL resource, or if the UL grant regarding SF #n is received at DL SF #(n−k) (where k may be set to 4 or another value in advance), the UE may assume that no DL grant is transmitted at SF #(n−1) or may also assume that DL data is not transmitted at SF #(n−1).

(D) Alternatively, under the condition that the usage of two contiguous SFs (for example, SF #(n−1) and SF #n) is established as the usage of UL resources, assuming that the usage of SF #(n−1) is changed from UL resource to DL resource, or if the DL grant regarding SF #(n−1) is received at SF #(n−1) or (predefined) previous SF, the UE may assume that the UL grant regarding SF #n is not received at SF #(n−k) (where k may be set to 4 or another value in advance) or may also assume that UL data is not transmitted at SF #n.

If SF #n is used as a DL resource and SF #(n+1) is used as a UL resource, the DL data transmission region of SF #n may overlap with the UL data transmission region of SF #(n+1) due to the propagation delay or timing advance between the eNB and the UE or due to the Tx/Rx switching time between the eNB and the UE. Accordingly, the seventh embodiment can efficiently solve the above-mentioned problem.

Figure 14:
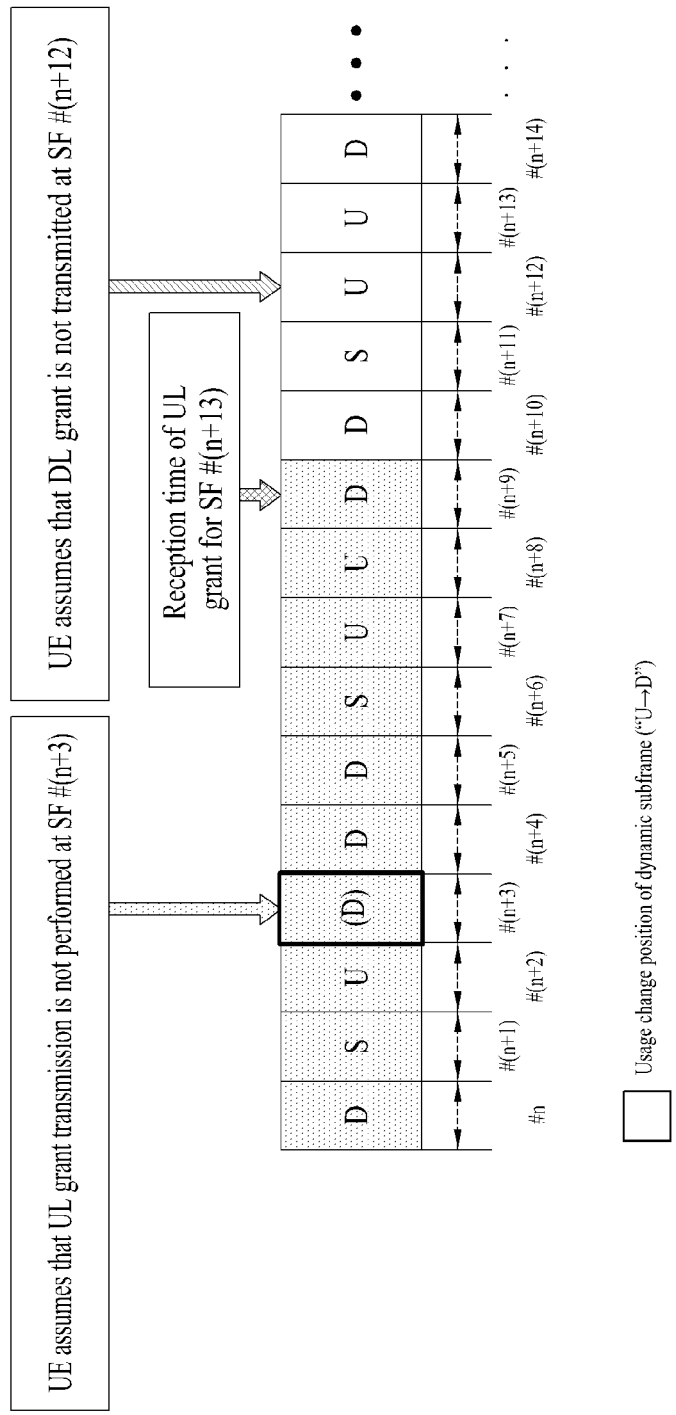
FIG. 14 is a conceptual diagram illustrating the operations of the seventh embodiment when the dynamic subframe configuration scheme is applied.

FIG. 14 is a conceptual diagram illustrating the operations of the seventh embodiment when the dynamic subframe configuration scheme is applied.

Referring to FIG. 14, it is assumed that UL-DL configuration #1 (i.e., subframe configuration) is denoted by [DSUUDDSUUD], SF #(n+3) denotes an SF, the usage of which is changed from the legacy UL resource to a DL resource, and the UL grant regarding SF #(n+13) is transmitted at SF #(n+9).

Therefore, the UE may assume that the UL grant is not transmitted at SF #(n+3) according to the scheme (A) of the seventh embodiment. In addition, the UE may assume that SF #(n+12) is not used or modified as DL resource on the basis of the scheme (B) of the seventh embodiment, and may also assume that the DL grant transmitted when SF #(n+12) is used as DL resource is not transmitted at the corresponding SF.

Eighth Embodiment

The 8$^{th}$ embodiment provides a method for enabling the eNB to inform the UE of specific information indicating candidates having the high probability of changing the SF usage through higher layer signaling or a physical channel. The UE may perform additional blind decoding (BD) at a PDCCH or E-PDCCH (Enhanced-PDCCH) region (for example, a common search space) or at a UE-specific search space at a reception time of the DL/UL grant of the corresponding SF on the basis of the above-mentioned information. In this case, E-PDCCH may be used as a control channel proposed by the LTE-A system, or may be set to another region (for example, PDSCH) different from the legacy PDCCH, or may be decoded on the basis of another reference signal different from that of the legacy PDCCH.

Information indicating candidates having a high probability of changing the SF usage may be configured in the form of a bitmap of a predetermined length, and the update period of the corresponding information may be pre-shared or pre-established between the eNB and the UE. For example, if a specific bit of the bitmap is set to 1, this means that the usage of the corresponding SF is changed to another usage. If a specific bit is set to zero (0), this means that the usage of the corresponding SF is maintained.

Figure 15:
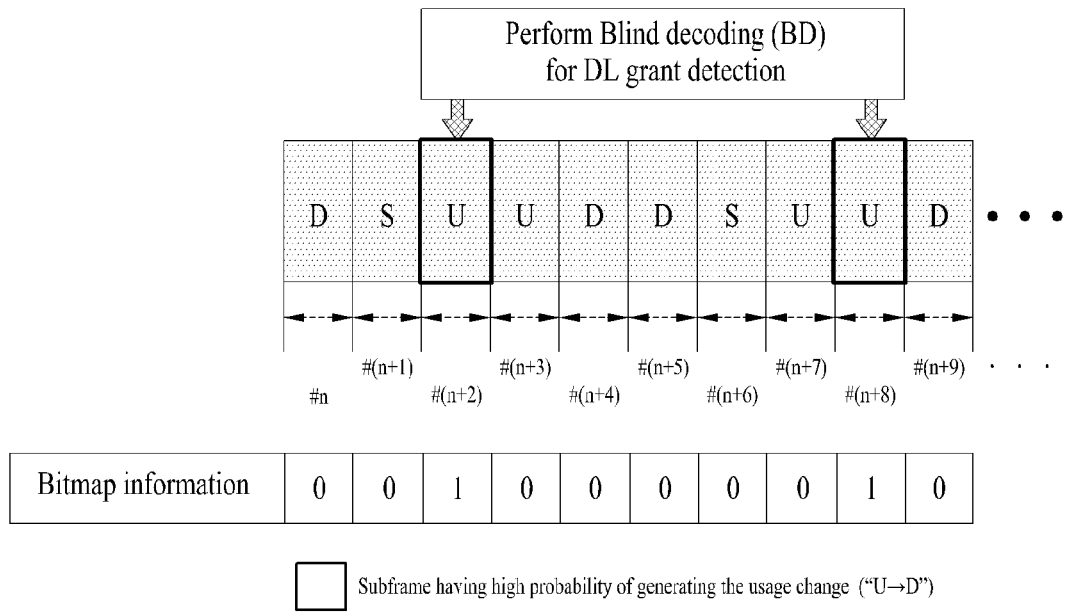
FIG. 15 is a conceptual diagram illustrating the operations of the eighth embodiment under specific UL-DL configuration.

FIG. 15 is a conceptual diagram illustrating the operations of the eighth embodiment under specific UL-DL configuration. Specifically, FIG. 15 assumes that UL-DL configuration #1 (i.e., subframe configuration) is denoted by [DSUUDDSUUD]. In addition, FIG. 15 assumes that a bitmap indicating specific information of some candidates having a high probability of changing the SF usage is denoted by "0010000010". In this case, if a specific bit of the bitmap is set to the value of 1, this means that there is a high probability that the legacy usage of the subframe will be changed to another usage. If the specific bit is set to zero (0), this means that the legacy usage of the subframe is maintained.

Referring to FIG. 15, assuming that SF #n designated for UL resource is set to another SF having a high probability of changing the usage of DL resource, associated DL grant may be transmitted through a common search space or UE-specific search space on PDCCH or E-PDCCH of SF #n. Accordingly, the UE may perform blind decoding (BD) of the corresponding DL grant in a common search space or UE-specific search space on a PDCCH or E-PDCCH of SF #(n+2) and SF #(n+8).

Meanwhile, assuming that a specific cell or a specific eNB may inform UEs configured to communicate with the specific cell or eNB, of information of candidates having a high probability of changing the SF usage according to the eighth embodiment, the corresponding information may be signaled to a contiguous cell or a contiguous eNB through an X2 interface or a predefined radio channel, the inter-cell interference reduction (or cancellation) coordinated operation of a PDCCH or E-PDCCH may be efficiently carried out at a reception time of the DL/UL grant interlocked with the corresponding SF.

In this case, if E-PDCCH may be used for transmission of a DL grant or UL grant, or if PDCCH and E-PDCCH are simultaneously used, the DL grant and the UL grant may be assigned to different frequency-time domains. In this case, each of a specific cell and a contiguous cell may independently perform the inter-cell interference reduction (or cancelation) coordinated operation of the DL grant and the UL grant.

Figure 16:
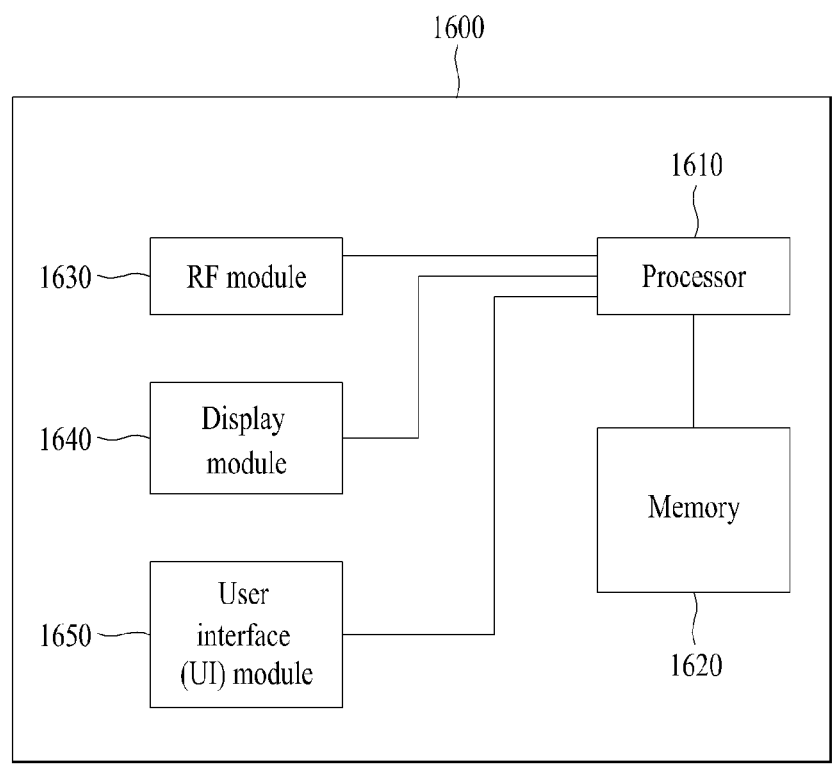
FIG. 16 is a block diagram illustrating a communication device according to embodiments of the present invention.

FIG. 16 is a block diagram illustrating a communication device according to embodiments of the present invention.

In FIG. 16, the communication device 1600 includes a processor 1610, a memory 1620, a Radio Frequency (RF) module 1630, a display module 1640, and a user interface (UI) module 1650.

The communication device 1600 is disclosed for illustrative purposes only and certain modules may also be omitted from the communication device 1600 as necessary. In addition, the communication device 1600 may further include necessary modules. Some modules of the communication device 1600 may be identified as more detailed modules. The processor 1610 is configured to carry out the operations of the embodiments of the present invention. For detailed operations of the processor 1610 reference may be made to FIGS. 1 to 15.

The memory 1620 is connected to the processor 1610, and stores an operating system, applications, program code, data and the like. The RF module 1630 is connected to the processor 1610 and converts a baseband signal into a radio frequency (RF) signal, or converts the RF signal into the baseband signal. For these operations, the RF module 1630 performs analog conversion, amplification, filtering, and frequency up-conversion in order or performs such operations in reverse order. The display module 1640 is connected to the processor 1610 and displays a variety of information. The scope or spirit of the display module 1640 of the present invention is not limited thereto, and the display module 1640 may be any of well-known elements, for example, a Liquid Crystal Display (LCD), a Light Emitting Diode (LED), an Organic Light Emitting Diode (OLED) and the like. The user interface (UI) module 1650 is connected to the processor 1610, and may be implemented as a combination of user interfaces such as a keypad, a touchscreen, etc.

The embodiments of the present invention may be used for UEs located at a cell edge receiving a high interference under the environment in which UL-DL configurations between contiguous cells are different from each other. In addition, the concept of the present invention can be extended to the case in which carrier aggregation (CA) is applied. For example, the above concept of the present invention can also be applied to the case in which a specific CC may be commonly applied to a plurality of cells and the usage of the corresponding CC is independently established per cell. In addition, the above embodiments can also be applied to the case in which the usage of a specific legacy radio resource of a Secondary CC (SCC) is changed to another usage using Cross Carrier Scheduling (CCS) at a Primary CC (PCC).

The concept of the present invention can also be extended to the case in which PDCCH or E-PDCCH based communication is performed. In addition, assuming that the extension carrier is used for additional communication, the concept of the present invention can be applied to the case in which the usage of radio resources of the corresponding extension carrier is established, and can also be applied to the other case in which the inter-cell interference reduction coordinated operation is designed to share the extension carrier.

If it is impossible to perform UL/DL communication at a position of a specific resource (time/frequency) due to various reasons, the concept of the present invention can be extended to the method for solving the HARQ (or CSI reporting) problem. For example, assuming that Almost Blank Subframe (ABS) is used to solve the inter-cell interference problem encountered in communication between the receiver and the transmitter, if UL-DL configurations of respective component carriers (CCs) used for communication between the transmitter and the receiver are different from each other, and if ABS configurations of respective CCs used for communication between the receiver and the transmitter are different from each other, the above-mentioned embodiments can be applied to the case in which resources (time/frequency) valid for communication between the receiver and the transmitter are not established (more specifically, in the case of communication between the eNB and the relay node, or communication between the relay node and the UE), or can also be applied to the other case in which the usage of (predefined) specific resource of each CC used for communication between the receiver and the transmitter is (dynamically) changed according to a load state of the system.

The proposed schemes may perform D2D (Device-to-Device) communication at a specific band allocated for the communication usage under the D2D communication environment, or may change the usage of (cell) specific predefined radio resource such that the above schemes can be extended to the case of reusing D2D communication.

It will be appreciated by persons skilled in the art that the objects that can be achieved by the present invention are not limited to what has been particularly described hereinabove and the above and other objects that the present invention can achieve will be more clearly understood from the foregoing detailed description taken in conjunction with the accompanying drawings. The exemplary embodiments described hereinabove are combinations of elements and features of the present invention. The elements or features may be considered selective unless otherwise mentioned. Each element or feature may be practiced without being combined with other elements or features. Further, the embodiments of the present invention may be constructed by combining parts of the elements and/or features. Operation orders described in the embodiments of the present invention may be rearranged. Some constructions or characteristics of any one embodiment may be included in another embodiment and may be replaced with corresponding constructions or characteristics of another embodiment. It is apparent that the present invention may be embodied by a combination of claims which do not have an explicitly cited relation in the appended claims or may include new claims by amendment after application.

The embodiments of the present invention may be achieved by various means, for example, hardware, firmware, software, or a combination thereof. In a hardware configuration, the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the embodiments of the present invention may be achieved by a module, a procedure, a function, etc. performing the above-described functions or operations. Software code may be stored in a memory unit and driven by a processor. The memory unit is located at the interior or exterior of the processor and may transmit data to and receive data from the processor via various known means.

It will be apparent to those skilled in the art that various modifications and variations can be made in the present invention without departing from the spirit or scope of the invention. Therefore, the above-mentioned detailed description must be considered only for illustrative purposes instead of restrictive purposes. The scope of the present invention must be decided by a rational analysis of the claims, and all modifications within equivalent ranges of the present invention are within the scope of the present invention.

As is apparent from the above description, although the method and apparatus for setting a dynamic subframe in a wireless communication system have been disclosed on the basis of application to 3GPP LTE, the inventive concept of the present invention is applicable not only to 3GPP LTE, but also to other mobile communication systems.

What is claimed is:

1. A method for receiving and transmitting a signal by a user equipment (UE) in a wireless communication system, the method comprising:

receiving system information including an uplink-downlink (UL-DL) configuration for a plurality of UL and DL subframes;

receiving information on a specific UL subframe among the plurality of UL and DL subframes indicated by the UL-DL configuration is being reconfigured to a DL subframe based on an indication of a physical control channel;

receiving a HARQ (Hybrid-Automatic Repeat and reQuest)-acknowledgment/negative acknowledgment (ACK/NACK) configuration information for the reconfigured DL subframe through a higher layer signaling;

receiving a downlink data on the reconfigured DL subframe;

transmitting a first HARQ-ACK/NACK related to the downlink data based on the HARQ-ACK/NACK configuration information for the reconfigured DL subframe;

transmitting an uplink data based on the UL-DL configuration; and receiving a second HARQ-ACK/NACK related to the uplink data based on the system information, wherein the second HARQ-ACK/NACK related to the uplink data is received at a first timeline according to the system information which is different than a second timeline for the first HARQ-ACK/NACK related to the reconfigured DL subframe.

2. The method of claim 1, wherein the higher layer signaling indicates that the UL subframe is not used for a Multicast Broadcast Single Frequency Network (MBSFN) subframe.

3. The method of claim 2, wherein the higher layer signaling corresponds to a Radio Resource Control (RRC) message.

4. A user equipment (UE) for receiving and transmitting a signal in a wireless communication system, the UE comprising:

a radio frequency unit; and a processor operatively coupled with the radio frequency unit, wherein the processor is configured to:

receive system information including an uplink-downlink (UL-DL) configuration for a plurality of UL and DL subframes;

receive information on a specific UL subframe among the plurality of UL and DL subframes indicated by the UL-DL configuration is being reconfigured to a DL subframe based on an indication of a physical control channel;

receive a HARQ (Hybrid-Automatic Repeat and reQuest)-acknowledgment/negative acknowledgment (ACK/NACK) configuration information for the reconfigured DL subframe through a higher layer signaling;

receive a downlink data on the reconfigured DL subframe;

transmit a first HARQ-ACK/NACK related to the downlink data based on the HARQ-ACK/NACK configuration information for the reconfigured DL subframe;

transmit an uplink data based on the UL-DL configuration; and receive a second HARQ-ACK/NACK related to the uplink data based on the system information, wherein the second HARQ-ACK/NACK related to the uplink data is received at a first timeline according to the system information which is different than a second timeline for the first HARQ-ACK/NACK related to the reconfigured DL subframe.

5. The UE according to claim 4, wherein the higher layer signaling indicates that the UL subframe is not used for a Multicast Broadcast Single Frequency Network (MBSFN) subframe.

6. The UE according to claim 5, wherein the higher layer signaling corresponds to a Radio Resource Control (RRC) message.

* * * * *